US012767219B2

(12) United States Patent
Longo et al.

(10) Patent No.: US 12,767,219 B2
(45) Date of Patent: Oct. 20, 2026

(54) SAFE ORCHESTRATION OF ELECTROMECHANICAL ACTUATORS OF A DRIVE-BY-WIRE SYSTEM OF AN AUTOMATED VEHICLE

(71) Applicant: EMBOTECH AG, Zürich (CH)

(72) Inventors: Stefano Longo, Zürich (CH); Alexander Domahidi, Zürich (CH); Thivaharan Albin Rajasingham, Zürich (CH)

(73) Assignee: EMBOTECH AG, Zürich (CH)

( * ) Notice: Subject to any disclaimer, the term of this patent is extended or adjusted under 35 U.S.C. 154(b) by 45 days.

(21) Appl. No.: 18/824,465

(22) Filed: Sep. 4, 2024

(65) Prior Publication Data

US 2025/0074506 A1 Mar. 6, 2025

(30) Foreign Application Priority Data

Sep. 5, 2023 (EP) .................................... 23195527

(51) Int. Cl.
*B62D 6/00* (2006.01)
*B60W 60/00* (2020.01)
*B62D 5/00* (2006.01)

(52) U.S. Cl.
CPC ........... *B62D 6/001* (2013.01); *B60W 60/001* (2020.02); *B62D 5/001* (2013.01)

(58) Field of Classification Search
CPC ...... B62D 6/001; B62D 5/001; B62D 15/025; B60W 60/001; B60W 10/04; B60W 10/06;

(Continued)

(56) References Cited

U.S. PATENT DOCUMENTS 5,377,276 A * 12/1994 Terai ................ G10K 11/17854 381/71.4
5,791,430 A * 8/1998 Wan ..................... B60N 2/4221 180/282

(Continued)

FOREIGN PATENT DOCUMENTS

DE 102021117471 A1 1/2023

OTHER PUBLICATIONS

A Delay Compensation Framework for Predicting Heading in Teleoperated Ground Vehicles (Year: 2019).*

(Continued)

*Primary Examiner* — Fadey S. Jabr
*Assistant Examiner* — Faris Asim Shaikh
(74) *Attorney, Agent, or Firm* — Mannava & Kang, P.C.

(57) ABSTRACT

The invention is notably directed to a method of driving an automated vehicle (10) comprising a drive-by-wire (DbW) system (300) with electromechanical actuators. The method is performed by a validation unit (220), which is connected to a motion planning unit (106). The validation unit and the motion planning unit may form part of the vehicle, making it an autonomous vehicle. In variants, the validation unit and the motion planning unit form part of a central control unit, which, e.g., remotely steers the vehicle in a designated area. The method and revolves around receiving (S10) provisional commands and accordingly triggering (S70-S90) an actuation sequence. The provisional commands are received (S10) from the motion planning unit (106). The provisional commands contain provisional instructions with respective execution times. The provisional commands are designed to be executed by respective ones of the electromechanical actuators to cause the vehicle (10) to follow a drivable trajectory. The actuation sequence is triggered (S70-S90) by generating (S70) effective commands based on the provi- (Continued)

sional commands received and timely sending (S80) the effective commands generated to the electromechanical actuators, whereby an effective command containing an effective instruction is repeatedly generated (S70) for and sent (S80) to each actuator of said electromechanical actuators. Each effective command of at least some of the effective commands sent to said each actuator is generated (S70) by selecting (S76) provisional commands and accordingly determining (S77) the effective instruction of each effective command. That is, two or more provisional commands are selected (S76) among the provisional commands received in respect of each actuator, in accordance with an effective time point, the latter corresponding to a current time point corrected to compensate for an actuator delay of said each actuator. The effective instruction of each effective command is then determined (S77) based on provisional instructions of the two or more provisional commands selected and their respective execution times. The invention is further directed to related systems and computer program products.

19 Claims, 10 Drawing Sheets

(58) Field of Classification Search

CPC .......... B60W 2050/0042; B60W 10/20; G05D 2105/28; G05D 2107/70; G05D 2111/17; G05D 1/242; G05D 1/2464; G05D 2109/18; G05D 1/249; G05D 1/6987; G05D 1/0297; G05D 2109/10; G07C 5/008; G05B 2219/2603; G05B 2219/2637; G05B 2219/2641; G05B 2219/2663; Y02T 10/40; Y02T 10/12; Y02T 10/62

See application file for complete search history.

(56) References Cited

U.S. PATENT DOCUMENTS

| | | | | |
|---|---|---|---|---|
| 11,124,202 | B1* | 9/2021 | Stark | G05D 1/0223 |
| 2004/0095084 | A1* | 5/2004 | Mersch | E05F 15/695<br>318/62 |
| 2007/0119644 | A1* | 5/2007 | Yasui | B60G 17/018<br>180/183 |
| 2010/0222965 | A1* | 9/2010 | Kimura | B62D 15/025<br>701/1 |
| 2014/0107893 | A1* | 4/2014 | Nishimura | B62D 6/10<br>701/41 |
| 2015/0057886 | A1* | 2/2015 | Larsson | B60W 50/14<br>701/41 |
| 2016/0075324 | A1* | 3/2016 | Brombach | B60W 10/30<br>701/48 |
| 2017/0166241 | A1* | 6/2017 | Kim | B62D 5/0457 |
| 2017/0227567 | A1* | 8/2017 | Son | G06F 13/102 |
| 2018/0074880 | A1* | 3/2018 | Hartmann | H03K 17/16 |
| 2019/0118829 | A1* | 4/2019 | Goldberg | B60W 60/001 |
| 2021/0037495 | A1* | 2/2021 | Pfadler | H04W 56/0065 |
| 2021/0323564 | A1* | 10/2021 | Wang | B60W 50/06 |
| 2022/0118995 | A1* | 4/2022 | Ueno | B60W 60/001 |
| 2022/0413494 | A1* | 12/2022 | Kim | G05D 1/0038 |
| 2023/0094169 | A1* | 3/2023 | Kim | B60W 60/0011<br>701/25 |
| 2023/0152796 | A1* | 5/2023 | Zhang | G05D 1/0011<br>701/2 |
| 2023/0159018 | A1* | 5/2023 | Shekhar | B60T 8/1755<br>701/69 |
| 2024/0294183 | A1* | 9/2024 | Yuan | B60W 40/10 |
| 2024/0383498 | A1* | 11/2024 | Jing | B60W 60/001 |

OTHER PUBLICATIONS

The extended European Search Report for Application No. EP23195527.9, dated Feb. 28, 2024, 12 pages.

* cited by examiner

SAFE ORCHESTRATION OF ELECTROMECHANICAL ACTUATORS OF A DRIVE-BY-WIRE SYSTEM OF AN AUTOMATED VEHICLE

PRIORITY

The present application claims priority under 35 U.S.C. 119(a)-(d) to European Patent Application number EP 23 195 527.9, having a filing date of Sep. 5, 2023, the disclosure of which is hereby incorporated by reference in its entirety.

TECHNICAL FIELD

The invention relates in general to the fields of automated vehicles equipped with drive-by-wire (DbW) systems, as well as methods and computer program products for driving such automated vehicles. In particular, it is directed to methods implemented by a central control unit, which orchestrates commands sent to electromechanical actuators of the DbW system of one or more automated vehicles, where such commands correspond to trajectories computed by a motion planner and compensate such commands for actuator delays of the electromechanical actuators.

BACKGROUND

Self-driving vehicles (also known as automated vehicles or driverless vehicles) are vehicles that are capable of traveling with little, or even without, human inputs. Such vehicles use sensors (e.g., lidars, cameras, radars, sonars, GPS, and inertial measurement units) to perceive their surroundings. Sensory information is used to create a model of the vehicle's surroundings and the model is used to generate a navigation path.

Motion prediction is a necessary part of any autonomous driving application that employs predictive planning techniques. Often, a motion planning unit includes several, redundant motion planners, which are run in parallel on separate computer systems to ensure that automated driving functions operate safely and reliably. The motion planning unit transmits trajectories in the form of series of commands for electromechanical actuators of the drive-by-wire (DbW) system. During each algorithmic cycle, a series of successive commands are predicted for each actuator, where each command corresponds to a respective time point in the future. I.e., each command is timestamped. Such series are normally updated by the motion planning unit at each computational cycle. In principle, the motion planning unit or the DbW system may take into account actuator delays of the electromechanical actuators and refine the commands to compensate for such delays.

However, some delays may intervene in the transmission of signals encoding the trajectories between the motion planner(s) and the DbW system. For this reason, it is a priori more sensible to compensate for actuator delays of the actuators directly at the level of the DbW system. However, time synchronization issues may occur, notably between the motion planner(s) and the DbW system, which makes it difficult to adequately and timely compensate for actuator delays at the level of the DbW system. Thus, there is a need to improve schemes of orchestration of commands sent to electromechanical actuators of DbW systems.

SUMMARY

According to a first aspect, the present invention is embodied as a method of driving an automated vehicle. The vehicle comprises a drive-by-wire (DbW) system with electromechanical actuators. The method is implemented at, and thus performed by, a validation unit, which is in data communication with a motion planning unit. In embodiments, the vehicle is an autonomous vehicle, which comprises the validation unit and the motion planning unit. In variants, the validation unit and the motion planning unit form part of a central control unit (CCU), which orchestrates one or more automated vehicles, e.g., a fleet of vehicles equipped with DbW systems.

In all cases, the validation unit operates as an extrinsic entity. I.e., the validation unit is distinct from the motion planning unit and the DbW system. The proposed method basically comprises receiving trajectories from the motion planning unit and triggering an actuation sequence. That is, the validation unit receives provisional commands from the motion planning unit, where the provisional commands contain provisional instructions with respective execution times. The provisional commands are designed to be executed by respective ones of the electromechanical actuators to cause the vehicle to follow a drivable trajectory. The actuation sequence is triggered by the validation unit, by generating effective commands and timely sending the effective commands to the electromechanical actuators of the DbW system. The effective commands are generated based on the provisional commands received and then sent to the electromechanical actuators. An effective command contains an effective instruction; such a command is repeatedly generated for and sent to each actuator of the electromechanical actuators.

In some cases, it is sufficient to select a provisional command, the planned time point (i.e., timestamp) of which matches the actuator delay added to the current time, subject to a tolerance. That is, the effective command sent to each actuator corresponds to a provisional command selected in accordance with the current time and actuator delays. Such an approach systematically works as long as the tolerance permits. However, it no longer works (at least not systematically) when increasing the time lag (i.e., period) between consecutive commands or reducing the tolerance. Now, one may precisely want to increase the time lag between consecutive commands, to lower the computational load of the motion planning unit, or reduce the tolerance, to increase the safety of trajectories. In such cases, the actuator delays may lead to time mismatches between the timing of the provisional commands and the ideal times at which the commands should be executed by the actuators. Moreover, time synchronization may cause the DbW system to occasionally adjust its local time, again leading to time mismatches.

The present invention proposes a solution to adequately adjust the provisional commands in such cases. I.e., in accordance with the present invention, each effective command of at least some of the effective commands sent to each actuator is judiciously adjusted by the validation unit, i.e., outside of the motion planning unit and the DbW system, if not outside of the vehicle itself. Namely, each of said effective commands is generated by first selecting, among the provisional commands received from the motion planning unit in respect of each actuator, two or more provisional commands in accordance with an effective time point. This time point corresponds to a current time point corrected to compensate for an actuator delay by the respective actuator. Next, the validation unit determines the effective instruction of each of said effective commands based on provisional instructions of the two or more provisional commands selected and their respective execution times, e.g., by interpolation or extrapolation.

In other words, the present invention provides an extrinsic mechanism for compensating actuator delays of electromechanical actuators of a DbW system, which makes it possible to increase the time period between consecutive commands (and, therefore, lower computational efforts at the level of the motion planning unit) and/or decrease the tolerance used to select and send provisional commands to the actuators.

Relying on an external validation unit has several advantages. First, this makes it possible to mitigate latency issues that may arise due to computations by the motion planning unit and the transmission of the corresponding signals. Second, this allows for easy adaptation to actuator delays of actuators of the DbW system. As a result, the proposed solution is compatible with any types of motion planners and DbW systems. I.e., the motion planners and DbW systems can be used "as is", without modification (only the validation unit need be suitably configured). Third, the validation unit can be used as an entity, or as part of an entity, which centrally enforces a correct time synchronization across all components involved, starting with the motion planning unit(s) and the DbW system(s), as in embodiments. Fourth, the validation unit can be used to perform additional tasks, such as verifying and validating the provisional commands as initially computed by the motion planning unit. As a result, the proposed architecture makes it possible to shift the certification problem from the motion planning unit to the validation unit, while allowing security to be improved.

In embodiments, the provisional commands received further include respective expiration times. In that case, the two or more provisional commands are selected by the validation unit so that their respective expiration times are not anterior to said effective time point. Expiration times allow to keep control over the trajectories and, thus, secure the trajectories of the vehicle. Still, if necessary, the validation unit may generate an emergency command for each of the electromechanical actuators, notably in situations where the expiration times of the provisional commands available for selection are incompatible with the effective time point corresponding to any of the actuators.

In preferred embodiments, series of provisional commands are repeatedly received by the validation unit from the motion planning unit, and the method further comprises verifying, at the validation unit, that the provisional commands of a series received last are consistent with provisional commands of a series previously received, to further secure the trajectories.

Preferably, the provisional commands received are stored in a buffer memory of the validation unit. The two or more provisional commands are selected by the validation unit from provisional commands as stored in the buffer memory. The method further comprises deleting, from the buffer memory, provisional commands of the series previously received only if and once the provisional commands of the series received last have been verified to be consistent with the provisional commands of the series previously received. This makes it possible to timely clean the memory buffer, while still permitting consistency checks, it being noted the frequencies at which new series of commands are typically received. E.g., each of the series of provisional commands received determines a drivable trajectory whose time horizon is between 2 and 18 seconds, preferably between 4 and 10 seconds. Now, in each of the series, the execution times of successive provisional commands for each of the electromechanical actuators are spaced 60 to 190 ms apart, on average.

In preferred embodiments, said two or more provisional commands are selected by the validation unit for each actuator so that their respective execution times are the closest to the corresponding effective time point. For example, the provisional commands can be selected by the validation unit for each actuator so that at least one of their respective execution times is anterior to said effective time point and at least another one of their respective execution times is posterior to the corresponding effective time point. In that case, the effective instruction is determined by interpolating the provisional instructions of the two or more provisional commands selected, based on their respective execution times and the corresponding effective time point. E.g., exactly two provisional commands are selected, whereby the effective instruction is determined thanks to a first-order interpolation. In variants, or in other cases, two or more commands are selected, the respective execution times of which all anterior to the effective time point, and the validation unit performs an extrapolation, the expiration times permitting. Note, the validation unit may dynamically choose whether to perform an interpolation or an extrapolation, depending on the provisional commands available for selection and their expiration times.

In preferred embodiments, the motion planning unit is implemented by a first processing system, while the validation unit is implemented by a second processing system. The first and second processing systems may form part of the vehicle, should the vehicle be an autonomous vehicle, or an external control unit. In each case, each of the first processing system and the second processing system is distinct from the DbW system. Each system can advantageously be mapped onto respective processors or, even, be implemented as distinct computers.

Preferably, the method further comprises repeatedly coordinating independent clocks of the first processing system, the second processing system, and the DbW system, to ensure synchronization across the first processing system, the second processing system, and the DbW system. This is achieved thanks to local time messages that are repeatedly sent from the second processing system (e.g., the validation unit) to several recipients across the first processing system and the DbW system, for each of said recipients to accordingly adjust its internal clock.

The vehicle typically comprises a set of perception sensors (e.g., lidars and cameras). In variants, the perception sensors are external sensors, arranged across a designated area. In particularly preferred embodiments, the method further comprises, at the first processing system, forming a main perception based on signals from each of the perception sensors and estimating states of the vehicle based on feedback signals from the DbW system, prior to computing the provisional commands through the motion planning unit based on the perception formed and the estimated states. Moreover, the method further comprises, at the second processing system, forming an auxiliary perception based on signals from only a subset of the perception sensors (e.g., the lidars only), and validating the provisional commands received based on the auxiliary perception formed.

That is, all the sensors of the set are used to form the main perception. However, instead of re-using all of the perception sensors to form a full redundancy, only a subset of the sensors are used to form the auxiliary perception that is then used to validate the trajectories. In other words, distinct perceptions are formed from overlapping sets of sensors, whereby one of the perceptions formed is used to validate trajectories obtained from the other. This approach requires less computational efforts, inasmuch as less signals (and therefore less information) are required to form the auxiliary perception. Still, this approach is more likely to allow inconsistencies to be detected, thanks to the heterogeneity of sensor signals considered in input to the main and auxiliary perceptions.

In embodiments, the auxiliary perception is formed as a global representation, which includes a world representation embedding a representation of the automated vehicle. The method further comprises, at the second processing system, validating the estimated states, and updating both the world representation and the representation of the automated vehicle. The estimated states are validated based on the auxiliary perception formed, whereby the provisional commands are validated based on the validated states. The world representation is updated thanks to said signals from the subset of sensors, while the representation of the automated vehicle is updated thanks to one or more previously validated states of the vehicle. This way, a self-consistent solution is achieved, timewise, in which the auxiliary perception is used to validate states as computed by the first processing system, whereas the validated states are subsequently used to update the vehicle representation in the auxiliary perception.

A preferred architecture is one in which the first processing system further includes a main perception unit and a state estimation unit. The main perception unit is connected to each of the sensors and is configured to form the main perception. The state estimation unit, to which the DbW system is connected, is configured to estimate the states of the vehicle. The second processing system includes an auxiliary perception unit, in addition to the validation unit. The auxiliary perception unit is configured to form the auxiliary perception, while the validation unit is configured to repeatedly receive the provisional commands, validate the estimated states and the provisional commands, generate the effective commands, and send them to respective ones of the electromechanical actuators. Such an architecture makes it possible to safely implement the self-consistent solution discussed above, inasmuch as each essential function is mapped to a respective unit, which unit can incidentally be mapped onto a respective processing means.

In particular, the provisional commands may be validated by the validation unit by verifying that the corresponding trajectories is collision-free, based on said world representation, under the condition that the estimated states are validated. Note, this validation comes in addition to the consistency checks evoked above. I.e., the validation of the vehicle states acts as a software interrupt, whereby the trajectories can be recurrently and continually verified, until (i.e., unless) the vehicle states happen to be invalidated by the second processing system.

As noted earlier, the vehicle may be an autonomous vehicle, which comprises said motion planning unit and said validation unit, as well as a set of perception sensors. This way, the motion planning unit may compute the provisional commands based on signals from the perception sensors, as explained above.

In variants, the motion planning unit and the validation unit form part of a CCU, which is distinct from the vehicle. The CCU is in data communication with the vehicle, for the validation unit to timely send the effective commands generated to the electromechanical actuators. Furthermore, the CCU is in data communication with a set of perception sensors, which are arranged across a designated area. This way, the motion planning unit can compute the provisional commands based on signals received from the perception sensors, whereby the CCU is configured to steer the automated vehicle in the designated area.

What is more, the set of perception sensors, the motion planning unit, and the validation unit, may be configured so that the CCU is adapted to steer a plurality of automated vehicles in the designated area.

According to another aspect, the invention is embodied as a system for driving an automated vehicle. The system comprises the automated vehicle, which itself comprises a DbW system with electromechanical actuators. The system further comprises a motion planning unit and a validation unit. Such units may form part of the vehicle, should it be autonomous, or a CCU, as evoked above. In all cases, the validation unit is configured to receive, from the motion planning unit, provisional commands containing provisional instructions with respective execution times. Again, the provisional commands are designed to be executed by respective ones of the electromechanical actuators to cause the vehicle to follow a drivable trajectory. As explained above in respect of the present methods, the validation unit is further configured to trigger an actuation sequence by generating effective commands based on the provisional commands received and timely sending the effective commands generated to the electromechanical actuators. Consistently with the present methods, an effective command containing an effective instruction is repeatedly generated for and sent to each actuator of said electromechanical actuators, in operation. Moreover, each effective command of at least some of the effective commands sent to said each actuator is generated by: selecting, among the provisional commands received in respect of said each actuator, two or more provisional commands in accordance with an effective time point, the latter corresponding to a current time point corrected to compensate for an actuator delay of said each actuator, and determining the effective instruction of said each effective command based on provisional instructions of the two or more provisional commands selected and their respective execution times.

As noted above, the vehicle may be an autonomous vehicle, which comprises said motion planning unit and said validation unit, as well as a set of perception sensors, whereby the motion planning unit is configured to compute said provisional commands based on signals received from the perception sensors, in operation.

In variants, the system comprises a CCU, which is distinct from the vehicle and includes the motion planning unit and the validation unit. The CCU is in data communication with the vehicle, for the validation unit to be able to timely send the effective commands generated to the electromechanical actuators. In addition, the CCU is in data communication with a set of perception sensors arranged across a designated area, for the motion planning unit to compute said provisional commands based on signals from the perception sensors, whereby the CCU is configured to steer the automated vehicle in the designated area, in operation.

The system may actually include a plurality of automated vehicles, each according to said automated vehicle. The set of perception sensors, the motion planning unit, and the validation unit, may be configured so that the CCU is adapted to steer said plurality of automated vehicles in the designated area.

Interestingly, the perception sensors may be designed as movable sensors, i.e., sensors that can be relocated across the designated area. In that case, the CCU may be configured to instruct to move one or more of the movable sensors across the designated area for the movable sensors to be able to sense at least a part of the designated area and generate corresponding detection signals. This way, the CCU may automatically relocate the vehicles in the designated area. Unlike solutions based on static sensors, this approach relies on movable sensors, which reduces the number of required sensors and allows the sensor positions to be finely tuned in accordance with the logistic problem to be solved. For example, the movable sensors may be robots designed as ground vehicles, which have a form factor allowing them to pass under frames of the vehicles.

According to a final aspect, the invention is embodied as a computer program product for driving an automated vehicle as described above. The computer program product comprises a computer readable storage medium having program instructions embodied therewith. The program instructions are executable by processing means of the validation unit to cause the latter to perform steps in accordance with the present methods.

BRIEF DESCRIPTION OF THE DRAWINGS

These and other objects, features and advantages of the present invention will become apparent from the following detailed description of illustrative embodiments thereof, which is to be read in connection with the accompanying drawings. The illustrations are for clarity in facilitating one skilled in the art in understanding the invention in conjunction with the detailed description. In the drawings:

FIG. 2A is a detailed diagram of the various functions involved. FIG. 2B is a high-level diagram of an autonomous car that includes the processing systems and perception sensors. FIG. 2C is a high-level diagram of a system for driving an automated car, where the processing systems form part of a central control unit, which communicates with the car and perception sensors arranged across a designated area;

FIG. 4 shows details of step S70 in FIG. 3;

The accompanying drawings show simplified representations of systems, devices, or parts thereof, and other concepts, as involved in embodiments. Similar or functionally similar elements in the figures have been allocated the same numeral references, unless otherwise indicated.

Systems and methods for driving vehicles, and related computer program products, will now be described, by way of non-limiting examples.

DETAILED DESCRIPTION OF EMBODIMENTS OF THE INVENTION

The following description is structured as follows. General embodiments and high-level variants are described in section 1. Section 2 addresses particularly preferred embodiments, while section 3 concerns technical implementation details. All references Sn refer to methods steps of the flowcharts of FIGS. 3 and 4, while numeral and letter references pertain to devices, components, and other concepts, as involved in embodiments of the present invention.

1. General Embodiments and High-Level Variants

Figure 1:
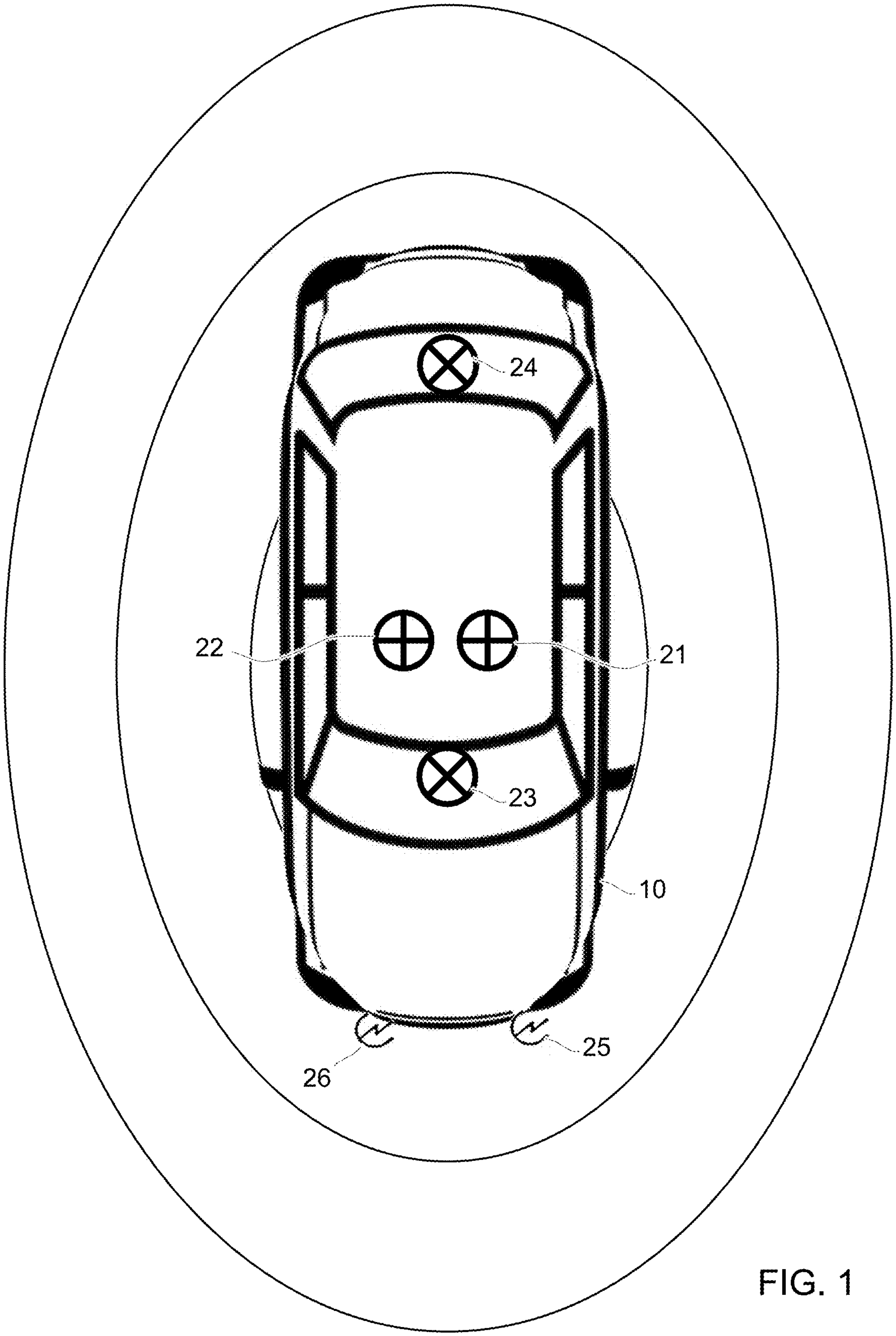
FIG. 1 is a top view of an automated car comprising a set of perception sensors (lidars, cameras, and radars) to sense the surroundings of the car, as in embodiments.

A first aspect of the invention is now described in detail in reference to FIGS. 1-4. This aspect concerns a method of driving an automated vehicle 10 such as depicted in FIG. 1. The vehicle 10 comprises a drive-by-wire (DbW) system 300, which itself includes electromechanical actuators (or "actuators" for short). The vehicle may further include a motion planning unit 106 and a validation unit 220, as seen in the diagram of FIG. 2A. In variants, the units 106, 220 form part of a central control unit (CCU) 2.

The vehicle 10 is at least partly automated and may have sensing capability. Note, the terminologies "autonomous" and "automated" are sometimes used as synonyms. In general, "autonomous", "semi-autonomous", and "partly autonomous", refer to concepts that involve some self-governance of machines, whereby such machines are capable of sensing their environment to safely move therein, avoiding obstacles and collisions with other objects, whether static or in motion. In this document, the terminology "automated" is to be understood in a broad sense. I.e., an automated vehicle is at least partly automated, so as to be at least partly autonomous, though not necessarily fully autonomous. That is, the vehicle incorporates automation to move (e.g., drive), whereby it can automatically drive from one location to another. The vehicle may further have sensing capability to sense its environment, so as to be aware of its location and surroundings. In the present description, an automated vehicle is a vehicle that is equipped with a DbW system. The vehicle may further have sensing and processing capability, so as to be autonomous. Thus, in this description, an automated vehicle can be an autonomous vehicle, i.e., a vehicle that includes a DbW system, as well as perception sensors and processing means, implementing the motion planning unit and the validation unit.

The vehicle can have various levels of autonomy. At the very least, the automated system of the vehicle (see FIG. 2 for an example) is capable of taking control of the vehicle for the latter to start, accelerate, brake, steer, and stop, so as to be able to move from one location to another. The automated vehicle 10 is a ground vehicle, typically an automated car. In principle, such vehicles can be of any type, e.g., cars, vans, transit buses, motorcoaches, trucks, lorries, or any other types of ground vehicles that may benefit from automation. In typical embodiments, though, the present automated vehicles are production cars, vans, electric vehicles, or the likes, which benefit from automatic driving and are at least level 2 (hands off), possibly level 3 (eyes off), level 4 (mind off), or level 5 (steering wheel optional), according to the system developed by SAE International (formerly named the Society of Automotive Engineers).

In variants, the automated vehicle only includes a DbW system, while perception sensors and processing means are external components, distinct from the vehicle. Still, the vehicle may have minimal processing capability, if only to manage emergency stops. In all cases, the present methods involve a motion planning unit 106 (to compute provisional commands) and a validation unit 220 (to validate such commands), where the validation unit 220 operates as an extrinsic entity. I.e., the validation unit 220 is distinct from the motion planning unit 106 and the DbW system 300 of the vehicle.

The present method revolves around turning the provisional commands as initially computed by the motion planning unit 106 into effective commands for the actuators, so as to orchestrate the execution of such commands by the actuators. The method is implemented at, and thus performed by, the validation unit 220.

Figure 3:
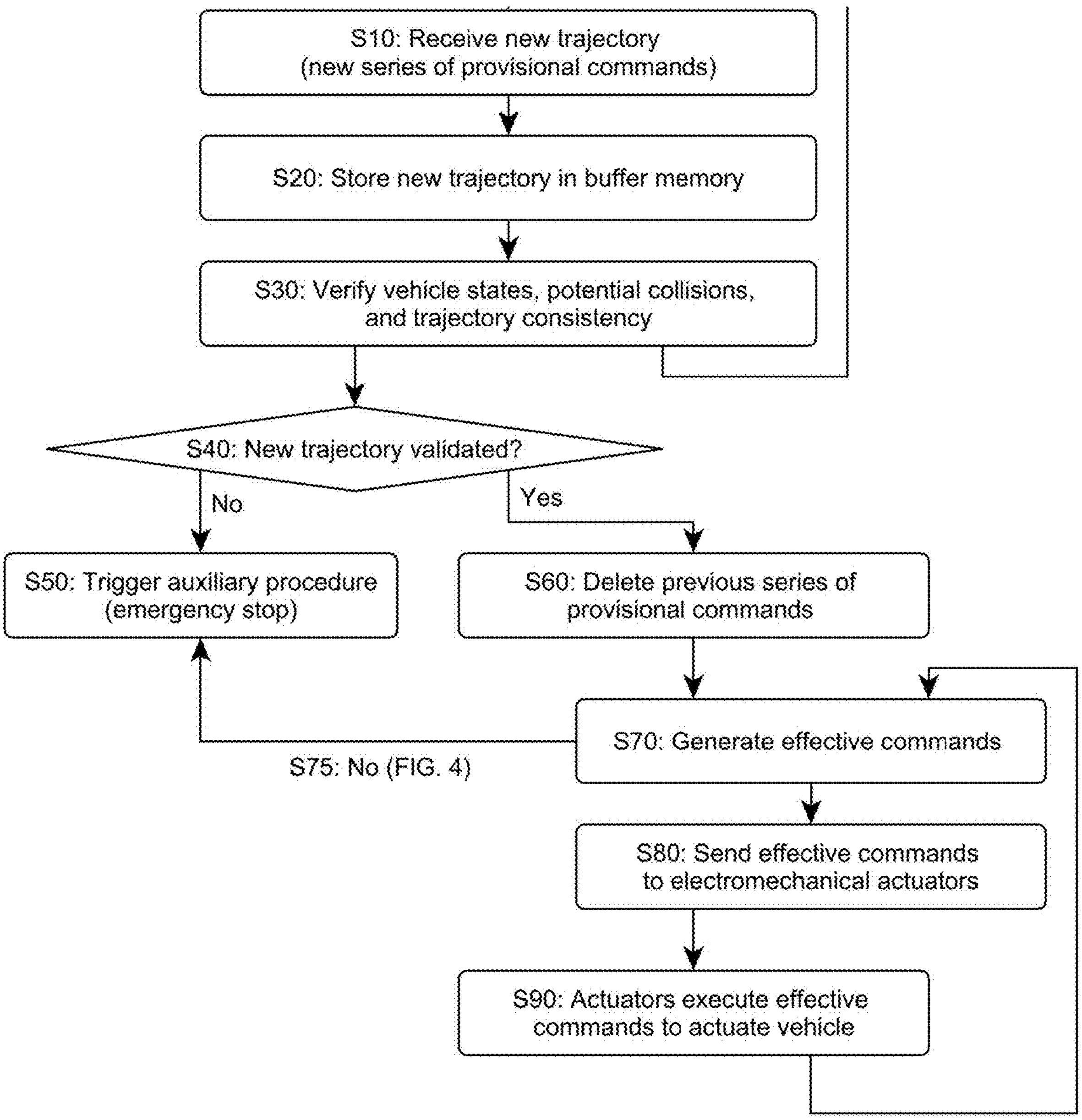
FIGS. 3 and 4 are flowcharts illustrating high-level steps of a method of driving an automated car, according to embodiments.

FIG. 3 shows high-level steps of an embodiment of the method, which basically comprises receiving trajectories from the motion planning unit and accordingly triggering an actuation sequence.

In detail, the validation unit 220 first receives (step S10 in FIG. 3) provisional commands from the motion planning unit 106. The provisional commands contain provisional instructions with respective execution times. Such commands are designed to be executed by respective actuators to cause the vehicle 10 to follow a drivable trajectory. A trajectory is defined as a time-ordered set of states of the vehicle. Practically speaking, though, a trajectory can be defined as a series of commands for respective actuators (e.g., responsible for acceleration, steering, and braking) and for successive time points. That is, the commands embody a trajectory, which is typically determined in accordance with a goal set in space, or preferably in both space and time.

The validation unit further triggers (steps S70-S90 in FIG. 3) an actuation sequence by generating S70 effective commands, based on the provisional commands received, and timely sending S80 the effective commands generated to the electromechanical actuators of the DbW system 300. In practice, an effective command contains an effective instruction; an effective command is repeatedly generated S70 for each actuator and sent S80 to each actuator, at each time instant $t_i$ (see FIGS. 5 and 6), i.e., during each algorithmic cycle of the validation unit.

Figure 5:
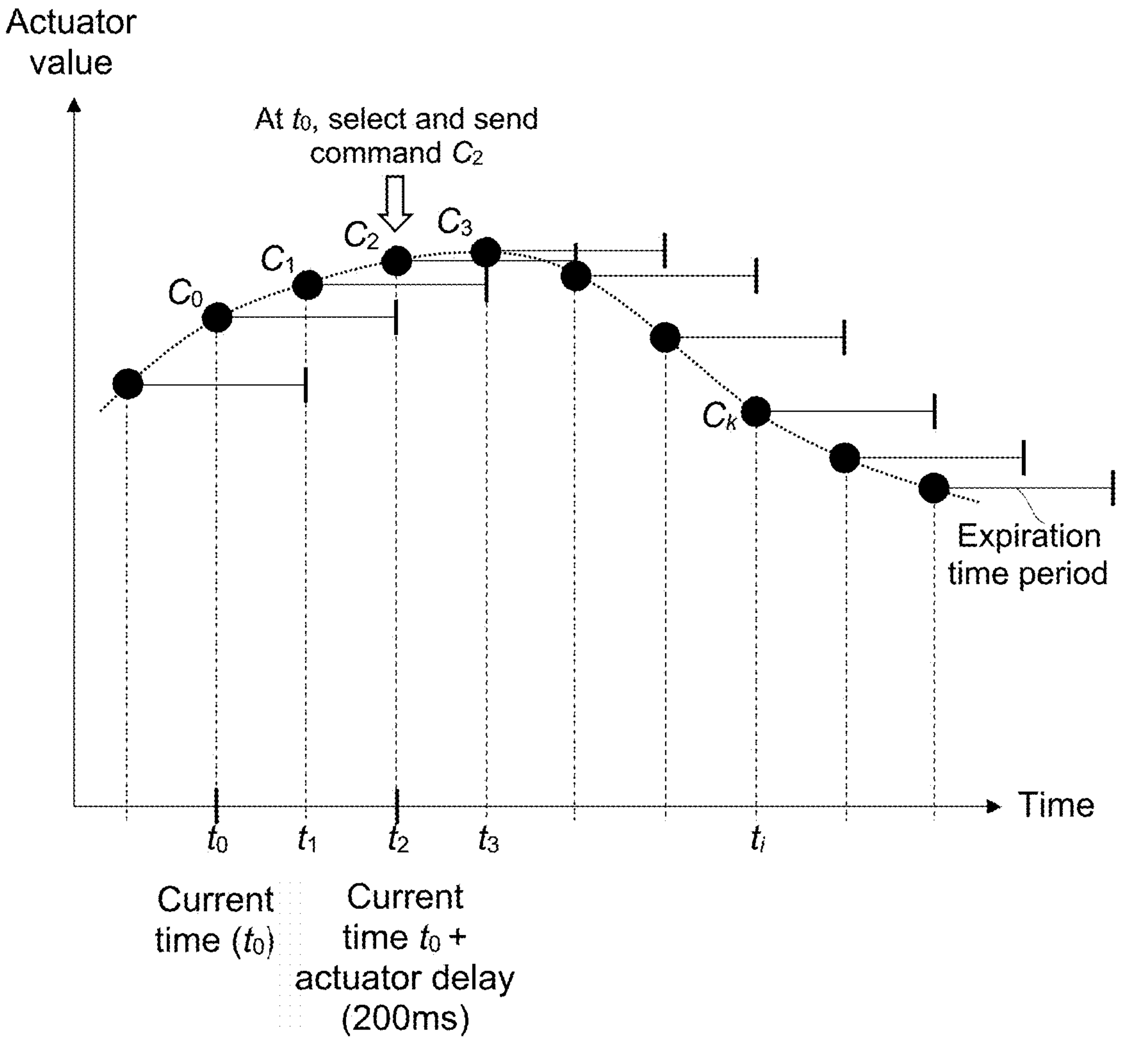
FIGS. 5 and 6 are charts of series of values of a quantity to be converted into a mechanical output by a given electromechanical actuator, where such values are timestamped. The series of values are predicted by a motion planner for this actuator. A validation unit selects and sends a given value, taking into account the actuator delay (FIG. 5) or interpolates two selected values (FIG. 6), as in embodiments.

As illustrated in FIG. 5, it may sometimes be sufficient to select a given provisional command, the time point (i.e., a timestamp corresponding to the initially planned execution time) of which matches the actuator delay added to the current time. This selection will typically be subject to a small tolerance (not shown in FIG. 5). That is, the effective command sent to each actuator corresponds to a provisional command judiciously selected in accordance with the current time and the actuator delay, i.e., the time needed by the actuator to effectively execute the command. In principle, such an approach works as long as the time lag between the timestamp of the selected command matches the desired time, subject to a small tolerance (typically on the order of a few ms).

However, this approach will no longer work when increasing the time lag between consecutive commands or decreasing the tolerance, as the actuator delays will mostly result in effective time points of execution that do not match the timestamps of the commands. I.e., such situations will mostly lead to mismatches between the planned execution times of the provisional commands and the ideal times at which such commands should be executed by the actuators, taking into account their actuation delays.

Figure 4:
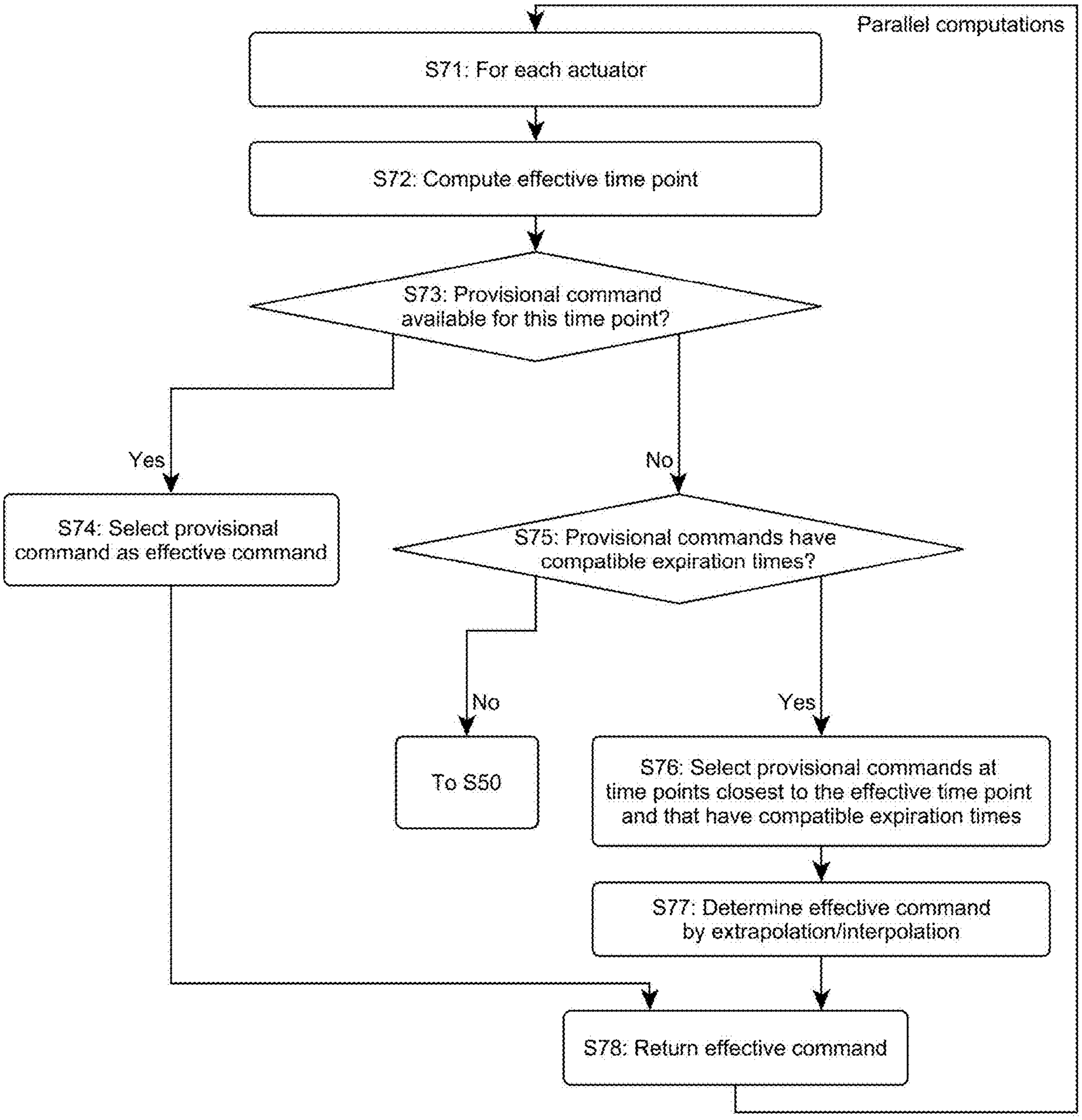

The present invention proposes a solution to adequately adjust the provisional commands in such a scenario, whereby at least some of the effective commands sent to each actuator are adjusted by the validation unit 220. As illustrated in the flow of FIG. 4, some of the effective commands sent to each actuator are generated S70 by composing S77 a new command based S76 on a mixture of provisional commands, whenever the situation calls for it (S73: No, S75: Yes). Namely, each of the effective commands concerned is generated by first selecting S76 at least two provisional commands and then composing S77 a new command.

In detail, the validation unit 220 selects S76 two or more provisional commands among the provisional commands received in respect of each actuator. The provisional commands are selected S76 in accordance with an effective time point, which corresponds to a current time point corrected to compensate for the actuator delay of the actuator. Next, the validation unit 220 determines S77 the effective instruction of each effective command based on provisional instructions of the two or more provisional commands selected and their respective execution times, as initially planned by the motion planning unit.

In other words, an effective instruction is determined based on provisional instructions of the selected provisional commands and their respective execution times. An effective instruction can notably be extrapolated or interpolated from those provisional commands that are the closest in time to the effective time point. Further schemes can be contemplated, such as schemes based on lookup tables or machine learning inferences. In some cases (S73: Yes), however, it is not needed to adjust the provisional instructions because the planned execution time of the provisional command and the effective time point of the actuator concerned happen to match, as noted above.

The vehicle 10 will eventually follow an effective trajectory, where the effective trajectory results from the effective commands sent S78, S80 to the actuators, which execute S90 such command and accordingly actuate the vehicle. That is, actuator commands determine a trajectory. The effective trajectory of the vehicle (i.e., its actual trajectory) can be defined as a time-ordered set of the true states of the vehicle.

The proposed method allows instructions to be directly adjusted at the validation unit 220, taking actuator delays and signal communication delays into account. Forming effective commands that compensate actuation delays makes it possible to increase the time period between consecutive commands and, therefore, lower computational efforts at the level of the motion planning unit 106.

Importantly, however, the effective commands are not generated by the motion planning unit 106 or the DbW system 300 in the present context. Instead, the above method is performed by an extrinsic unit, i.e., the validation unit 220, which communicates with the motion planning unit 106 and the DbW system 300. Relying on an external unit 220 has several advantages. First, this makes it possible to mitigate latency issues that may arise due to computations by the motion planning unit 106 (which may involve redundant motion planners) and the transmission of the corresponding signals. Second, this allows for easy adaptation to actuator delays of actuators of the DbW system. As a result, the proposed solution is compatible with any types of motion planners and DbW systems. I.e., motion planning solutions and DbW systems can be used "as is", without modification; only the validation unit need be suitably configured to implement the present methods, whether at a CCU or the vehicle itself. Second, this external unit 220 can be used as an entity, or as part of an entity 200, which centrally enforces a correct time synchronization across all components involved, starting with the motion planning unit and the DbW system, as in embodiments discussed below. Third, the validation unit 220 can be used to perform additional tasks, such as verifying and validating S30 the provisional commands as initially computed by the motion planning unit 106, e.g., based on vehicle states that are validated thanks to heterogenous validation checks, as in preferred embodiments discussed later. As a result, the proposed architecture makes it possible to shift the certification problem to the validation unit. Now, the validation unit 220 can be fairly easily certified, hence removing the hard requirement of certifying the complex motion planning, which only needs to be quality managed. DbW systems will normally also be subject to certifications, hence the advantage of not having to modify such systems.

Figure 6:
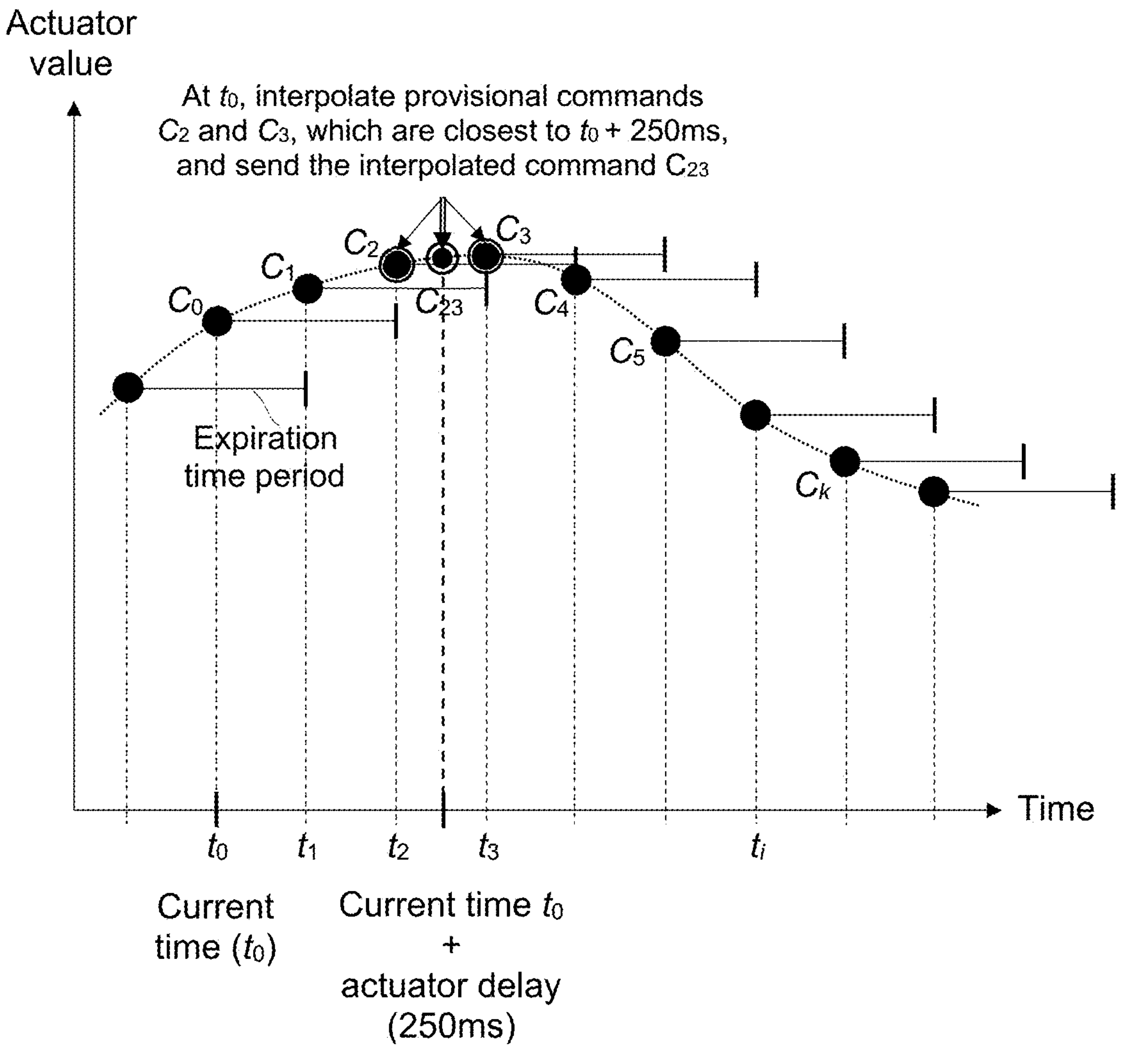

As illustrated in FIGS. 5 and 6, the provisional commands as received by the validation unit may advantageously include respective expiration times (i.e., expiration dates). That is, the commands are made to be considered outdated at times posterior to such expiration times. I.e., the provisional commands have to be executed, or somehow used, before expiry of their respective expiration times or else they should be ignored by the validation unit. In this context, the provisional commands are selected S76 by the validation unit 220 so that their respective expiration times are not anterior to the effective time point calculated for the actuator concerned. To summarize, the effective instructions are preferably generated (e.g., interpolated) based on provisional instructions (i.e., operands), taking into account the respective execution times of such operands as initially planned by the motion planning unit, subject to their expiration times. The expiration times allow to keep control over the trajectories and, thus, secure the trajectories of the vehicle 10.

As further seen in FIGS. 3 and 4, the present methods may come to generate S50 an emergency command for each of the electromechanical actuators, should the expiration times of the provisional commands available for selection be incompatible (S75: No) with the effective time point corresponding to any of the actuators. That is, in the unlikely scenario that none of the provisional commands available for selection has a compatible expiration time, the validation unit 220 may trigger S50 an auxiliary procedure, which may lead to an emergency stop.

As suggested in FIG. 3, series of provisional commands are repeatedly received S10 by the validation unit 220 from the motion planning unit 106. Typically, the motion planning unit sends new series of provisional commands at each computational cycle. The validation unit 220 may advantageously verify S30 that the provisional commands of the series received last are consistent with provisional commands of the series previously received, e.g., the one, two, or three series immediately preceding. This consistency check can be performed using an ad hoc heuristic (e.g., based on discrete derivatives), or based on distances or similarities (e.g., using any suitable metric) between the instructions contained in the corresponding commands. A consistency check is performed for each new series of provisional commands received, prior to making such provisional commands available for selection, with a view to subsequently generating S70 effective commands. I.e., a consistency check is performed by the validation unit 220 prior to selecting S76 any commands to compose an effective command. An auxiliary procedure (e.g., leading to an emergency stop) may be triggered S50 should an inconsistency be detected. Note, the validation unit 220 may actually wait to receive one or more additional series of provisional commands and check the consistency of the new series before triggering an emergency stop, to avoid inadvertent stops. Additional verifications may be performed by the validation unit 220, as discussed later in detail.

The provisional commands received are typically stored in a buffer memory of the validation unit 220. Thus, the provisional commands are selected from provisional commands as stored in the buffer memory. When a new trajectory (meaning series of provisional commands for respective actuators and for successive time points) is sent by the motion planning unit 106, the old trajectory as stored in the buffer is normally obsolete. However, the validation unit 220 preferably checks if the latest trajectory is consistent with the previous trajectory, or a set of previous trajectories, hence the need of keeping a few sets of trajectories in the memory buffer. One this check has been performed, the old trajectories can be deleted. In other words, the validation unit 220 preferably deletes S60 provisional commands of series previously received only if and once the provisional commands of the series received last have been verified (S40: Yes) to be consistent with the previous commands. This way, if the latest trajectory happens to be invalid, the validation unit 220 can still rely on the previous commands to perform a few extrapolations based on the previously available commands, so as to temporize until a new trajectory arrives.

A series of provisional commands determines a drivable trajectory, whose time horizon is typically between 2 and 18 seconds, though preferably between 4 and 10 seconds. Each series of commands can actually be decomposed into $N_A$ subseries, each corresponding to a respective actuator (as said, $N_A$ is typically equal to 3). In each series, the execution times of successive provisional commands for each actuator are preferably spaced 60 to 190 ms apart, on average, meaning that each subseries typically contains between approximately 10 and 300 commands.

As already mentioned, the validation unit may have to perform extrapolation or interpolations, based on commands whose planned execution times are the closest to the effective time points of the actuators. In detail, the validation unit 220 may first select S76 provisional commands, for each actuator, so that their respective execution times are the closest to the corresponding effective time point, and then interpolate or extrapolate S77 effective commands, as the case may be. For example, two or more commands may be selected for extrapolation. In that case, the corresponding planed execution times are anterior to the effective time point of the actuator.

In preferred variants, however, the commands are selected for interpolation. In this case, one of the planned execution times (in fact the earliest execution time) should be anterior to the effective time point, while the latest execution time should be posterior to the effective time point, to enable a meaningful interpolation. The effective instruction is subsequently determined by interpolating S77 the provisional instructions of the two or more provisional commands selected, based on their respective execution times and the effective time point of the actuator concerned. The same applies to each actuator. More preferably, exactly two of the provisional commands are selected S76 and the effective instruction is determined S77 thanks to a first-order interpolation. In that case, the corresponding execution times are respectively anterior and posterior to the effective time point, as illustrated in FIG. 6.

An illustrative example is in order. The provisional commands received by the validation unit 220 are typically stored in a buffer memory. For example, short before time $t_0$, the motion planning unit 106 calculates and sends the following series of commands to the validation unit 220 for a particular actuator (call it $A_0$):

- Command $C_0$, to be tentatively executed at time $t_0$, with an expiration time corresponding to $t_0$+250 ms;
- Command $C_1$, to be tentatively executed at time $t_1$=$t_0$+100 ms, with an expiration time corresponding to $t_1$+250 ms, i.e., $t_0$+350 ms;
- Command $C_2$, to be tentatively executed at time $t_2$=$t_0$+200 ms with an expiration time corresponding to $t_0$+450 ms;
- Command $C_3$, to be tentatively executed at time $t_3$=$t_0$+300 ms with an expiration time corresponding to $t_0$+550 ms;
- Etc. The same applies to each command $C_k$, where k=1 to $N_C$, $N_C$ denoting the number of provisional commands sent at each computational cycle by the motion planning unit 106 ($N_C$ can typically be between approximately 10 and 300, as noted earlier).

Similar series of provisional commands are being computed in respect of each actuator $A_i$, i=1 to $N_A$, where $N_A$ denotes the total number of actuators. New series of commands will typically be computed and sent at time $t_1$ (or short before that time), then at time $t_2$, etc., and for each of the actuators $A_i$.

Consider the case of the actuator $A_0$, which is assumed to have a delay of 200 ms in the example of FIG. 5. That is, the actuator delay (200 ms) is a multiple of the time lag (100 ms) between the planned execution times of two consecutive commands. In this case, the validation unit 220 may simply select command $C_2$ at time $t_0$, because the 200 ms delay perfectly matches the timing of command 2 in this ideal case. Thus, at time $t_0$ (meaning the current time), the validation unit 220 sends command $C_2$ to the DbW system 300, as illustrated in FIG. 5. Note, the expiration delays are all assumed to be equal to 200 ms in this simple example, such that the expiration time of command $C_2$ is compatible with the selection performed.

Conversely, in the example shown in FIG. 6, the actuator $A_0$ is assumed to have a delay of 250 ms, which is no longer an integer multiple of the time lag (100 ms) between the execution times of two consecutive commands. The acceptable tolerance is assumed to be less than 50 ms in this example. However, at time $t_0$, the validation unit 220 may still send an interpolated command, called $C_{23}$. The instruction corresponding to the effective command $C_{23}$ captures the intensity of a quantity to be applied to the actuator $A_0$. The value of this instruction is interpolated based on instructions contained in commands $C_2$ and $C_3$, the planned execution times of which are respectively anterior to and posterior to the effective time point ($t_0$+250 ms in this case). Note, the expiration times of commands $C_2$ and $C_3$ (corresponding to $t_0$+450 ms and $t_0$+550 ms, respectively), are compatible with an execution at the effective time point $t_0$+250 ms.

The process goes on at each time instant $t_i$. E.g., the validation unit 220 may keep using previously calculated commands or interpolated/extrapolated commands. For example, at time $t_1$, the validation unit 220 may send a command interpolated from $C_3$ and $C_4$, then send a command interpolated from $C_4$ and $C_5$, etc. Even if no new fresh commands are received, the validation unit 220 can still interpolate commands, the expiration times permitting. That is, the above process may continue for a few time steps into the future even if the motion planning unit stops sending fresh commands, for some reason. After that, if no new fresh commands are received, the validation unit 220 can no longer assume that the previously calculated commands are still valid, and it may for instance request S50 an emergency stop.

Figure 2A:
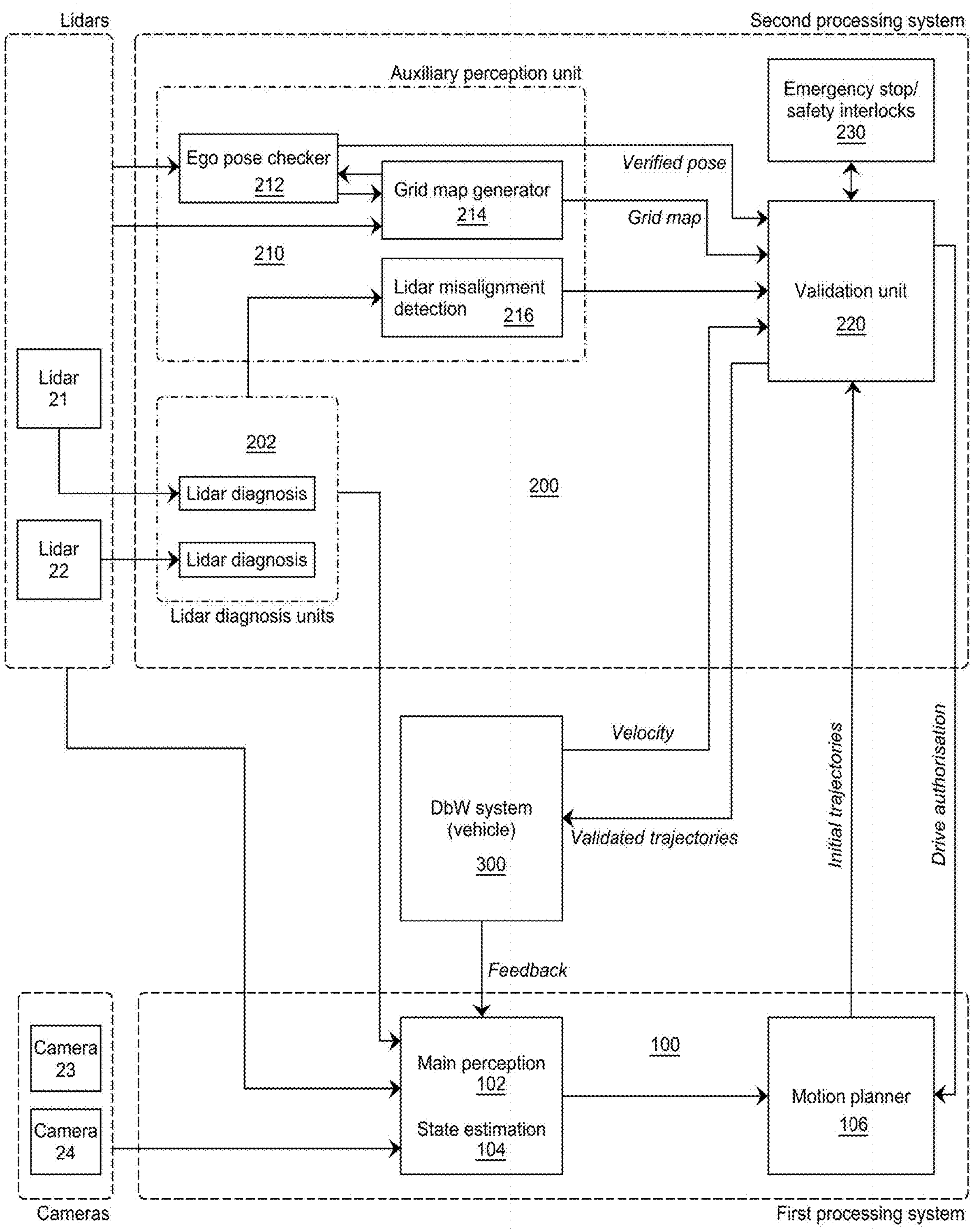
FIGS. 2A-2C are diagrams of system architectures for driving an automated or autonomous car, according to embodiments.
Figure 2B:
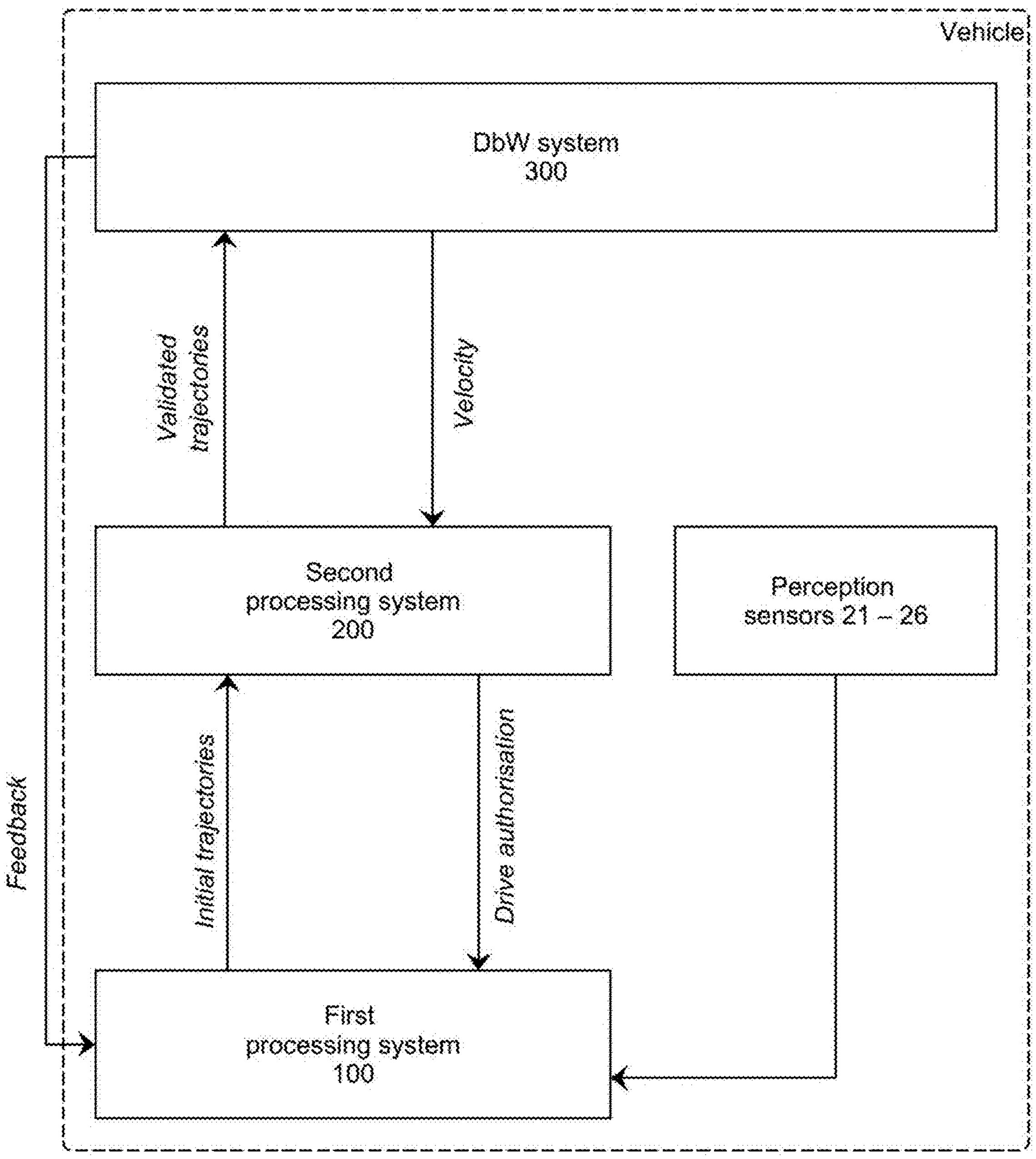
Figure 2C:
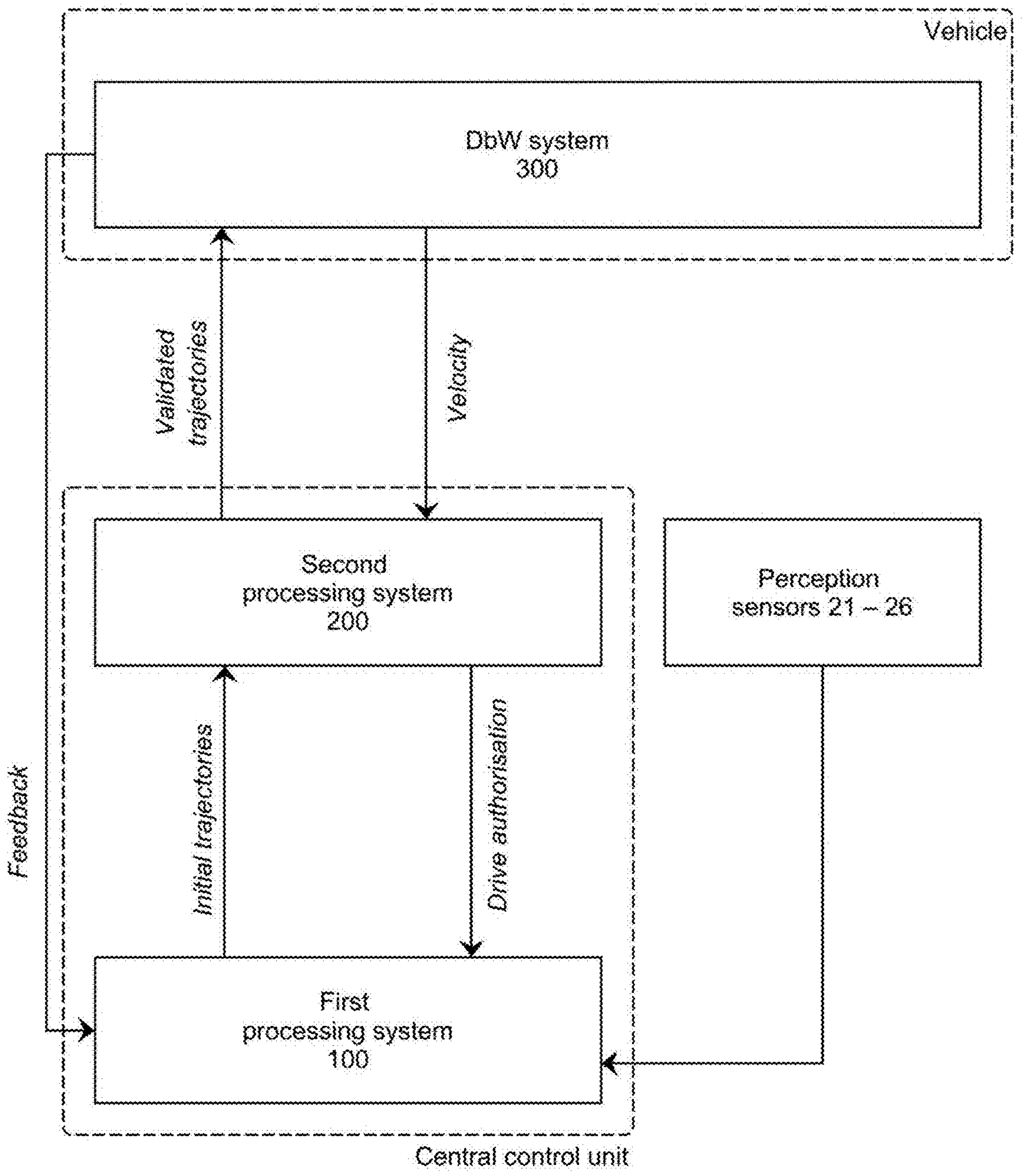

The following describes a particularly preferred architecture of the overall system, in reference to FIGS. 2A-2C. As seen in the diagram of FIG. 2A, the system includes a first processing system 100, which implements the motion planning unit 106, and a second processing system 200, which implements the validation unit 220B. In the diagram of FIG. 2B, the vehicle 10 is assumed to be an autonomous vehicle, which comprises the first processing system 100 and the second processing system 200, as well as perception sensors 21-26, in addition to a DbW system. On the contrary, in the diagram of FIG. 2C, the vehicle is merely automated through a DbW system 300, while the processing systems 100, 200 form part of a CCU 2, see FIG. 8. The vehicle has no sensing capability either; perception sensors are external sensors, arranged in a designated area, as discussed later.

In all cases, the validation unit receives the provisional commands from the first processing system 100, generates effective commands, and send them to the electromechanical actuators of the DbW system 300. Importantly, each of the first processing system 100 and the second processing system 200 is distinct from the DbW system 300. Like the validation unit 220, the second processing system 200 can more easily be certified than the first processing system 100, which contains the motion planning unit.

As noted earlier, the validation unit is ideally arranged to enforce clock synchronization. The validation unit may thus repeatedly coordinate the independent clocks of the first processing system 100, the second processing system 200, and the DbW system 300, to ensure synchronization across such entities. This is achieved using local time messages. For example, the validation unit may repeatedly send local time messages to several recipients across the first processing system 100 and the DbW system 300, for each of the recipients to accordingly adjust its internal clock. That is, the clocks of the motion planning unit 106 and the DbW system 300 may be synchronized from the validation unit 220. In variants, time synchronization is ensured by another component (preferably a component of the second processing system) that is connected to the validation unit.

Figure 7:
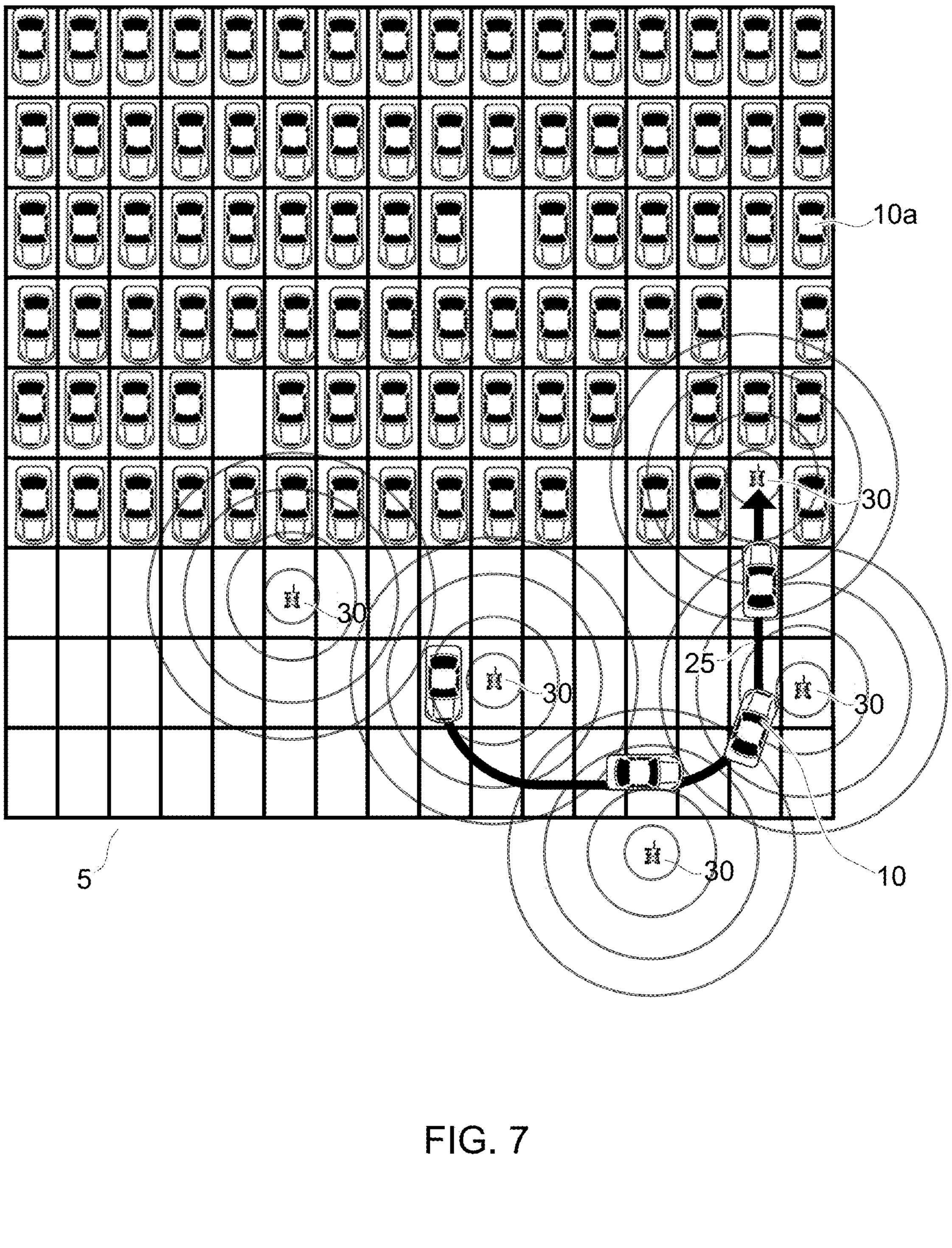
FIG. 7 schematically represents a top view of an industrial parking lot, where sensor robots (designed as ground vehicles) are moved across the parking lot to sense specific portions thereof and generate corresponding detection signals. Such detection signals are exploited to update a configuration of the parking lot and accordingly plan a vehicle trajectory, for a given automated vehicle to automatically drive to a destination position in the parking lot, in accordance with instructions received from a central control unit, as in embodiments.
Figure 8:
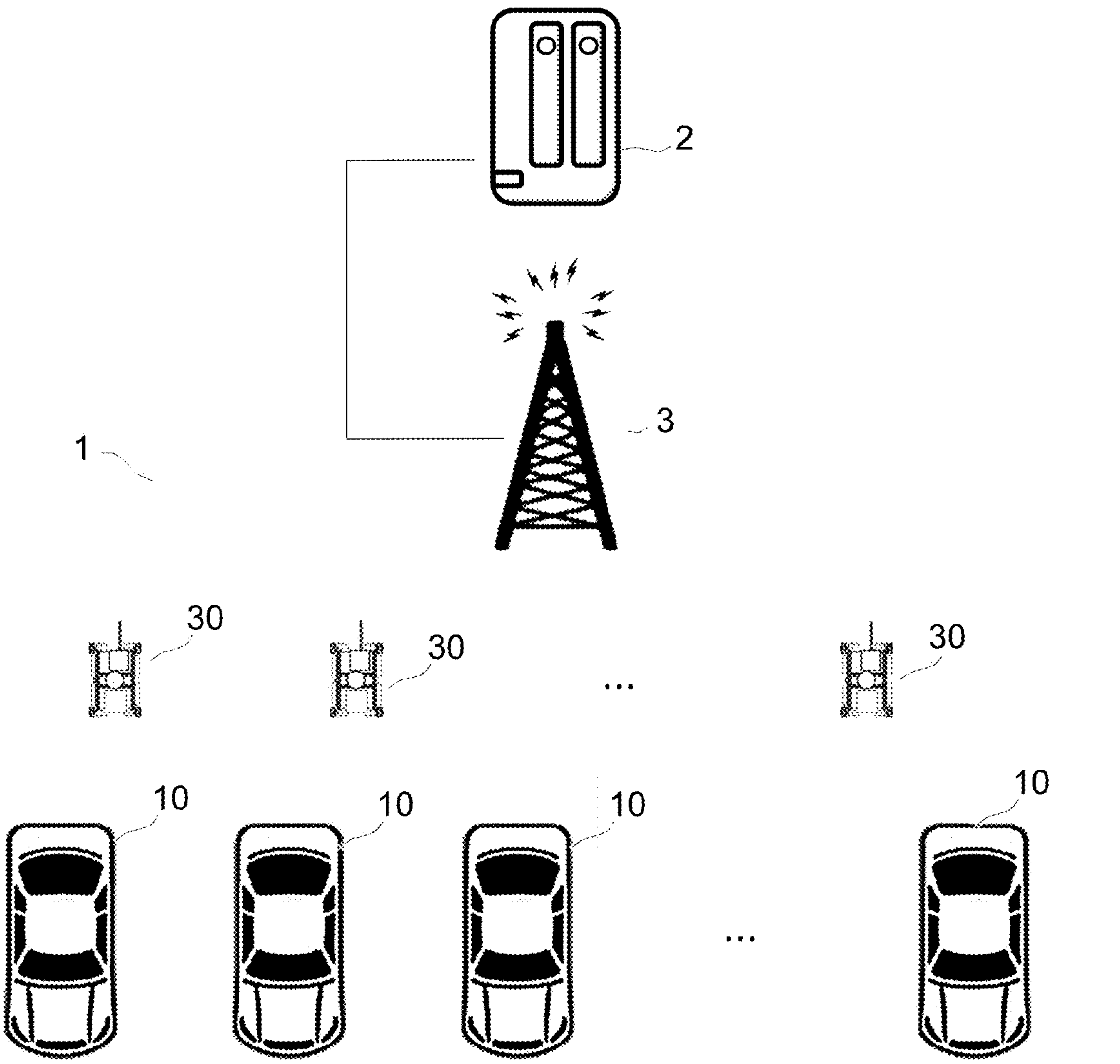
FIG. 8 is a diagram schematically illustrating selected components of a system according to embodiments, where the system includes a central control unit communicating with a fleet of movable sensors (designed as ground vehicles) to orchestrate relocations of automated vehicles.

FIGS. 1 and 2B assume that the vehicle 10 comprises a set of perception sensors 21-26, whereas the sensors are assumed to be external sensors in FIGS. 2C, 7, and 8. In all cases, though, the motion planning unit exploits signals provided by the sensors to compute trajectories. The motion planning unit may possibly comprise several motion planners, whereby redundant motion planners are run in parallel (normally on separate computer systems) to ensure that automated driving functions operate safely and reliably. However, redundancy multiplies the number of operations needed to process sensory information obtained from the sensors. Moreover, existing redundant systems are not infallible. For example, faulty sensors or faulty sensing schemes would normally result in the same planned motions, notwithstanding redundancy. Thus, there is a need to improve current redundancy schemes, both in terms of required computing power and performance.

A clever solution is to rely on heterogeneous redundancy checks. That is, the first processing system 100 may form a main perception based on signals from each of the perception sensors 21-26 and further estimate states of the vehicle 10, based on feedback signals from the DbW system 300. This way, the first processing system 100 can compute provisional trajectories (i.e., provisional commands) through the motion planning unit 106 based on the formed perception and the estimated vehicle states. Meanwhile, the second processing system 200 advantageously exploits only a subset of the sensors to form an auxiliary perception. That is, the second processing system uses signals from only a subset 21, 22 of the perception sensors. In turn, the validation unit 220 can validate the provisional commands received based on the auxiliary perception formed.

That is, all the sensors of the set are used to form the main perception. However, instead of re-using all of the perception sensors to form a full redundancy, only a subset of the sensors are used to form the auxiliary perception that is then used to validate the trajectories. In other words, distinct perceptions are formed from overlapping sets of sensors, whereby one of the perceptions formed is used to validate trajectories obtained from the other. This approach requires less computational efforts, inasmuch as less signals (and therefore less information) are required to form the auxiliary perception. Still, this approach is more likely to allow inconsistencies to be detected, thanks to the heterogeneity of sensor signals considered in input to the main and auxiliary perceptions.

In embodiments, the auxiliary perception is formed as a global representation, which includes a world representation embedding a representation of the automated vehicle 10. There, the second processing system 200 validates the estimated states based on the auxiliary perception formed, whereby the provisional commands are validated based on the validated states. The world representation is iteratively updated thanks to signals obtained from the subset of sensors, while the representation of the automated vehicle 10 is updated thanks to one or more previously validated states of the vehicle. This way, a self-consistent solution is achieved, timewise, in which the auxiliary perception is used to validate states as computed by the first processing system, whereas the validated states are subsequently used to update the vehicle representation in the auxiliary perception.

As further seen in FIG. 2A, the first processing system 100 may include a main perception unit 102, which is connected to (i.e., in data communication with) each of the sensors and is configured to form the main perception, as well as a state estimation unit 104, to which the DbW system 300 is connected. The state estimation unit 104 is configured to estimate the states of the vehicle 10. The second processing system 200 includes an auxiliary perception unit 210, in addition to the validation unit 220. The auxiliary perception unit 210 is configured to form the auxiliary perception, while the validation unit 220 is configured to repeatedly receive provisional commands, validate the estimated states and the provisional commands, generate the effective commands, and send them to respective actuators.

That is, beyond the consistency checks described earlier, the validation unit 220 may be used to validate the provisional commands by verifying S30 that the corresponding trajectories is collision-free, based on the world representation, yet under the condition that the estimated states are validated. I.e., the validation of the vehicle states acts as a software interrupt, whereby the trajectories can be recurrently and continually verified, until (i.e., unless) the vehicle states happen to be invalidated by the second processing system. Such an approach makes it possible to safely implement the self-consistent solution discussed above, inasmuch as each essential function is mapped to a respective unit, which unit can incidentally be mapped onto a respective processing means.

In that respect, the automated vehicle may further comprise sets of processors, where each of the sets comprises one or more processors. Now, the main perception unit, the state estimation unit, the motion planning unit, the auxiliary perception unit, and the validation unit, can advantageously be mapped onto respective ones of the sets of processors. Even, the first processing system and the second processing system are preferably implemented as distinct computers of the automated vehicle or the CCU. The exact mapping, however, may depend on the security levels offered by the (sets of) processors.

Some of the methods described herein can be performed to drive a vehicle such as shown in FIG. 1. In this example, the vehicle is an autonomous vehicle 10; the motion planning unit 106 and the validation unit 220 are implemented at the vehicle, which further comprises a set of perception sensors 21-26, so as for the motion planning unit 106 to compute provisional commands based on signals from the perception sensors 21-26.

Alternatively, some of the methods discussed herein are performed to drive an automated vehicle, i.e., a vehicle equipped with a DbW system 300, where the vehicle has no sensing capability and no (or limited) processing capability, as assumed in FIG. 8. In this case, the motion planning unit 106 and the validation unit 220 form part of a CCU 2, which is distinct from the vehicle. Still, the CCU 2 is in data communication with the vehicle, through one or more antennas 3, such that the validation unit can timely send S80 effective commands to the electromechanical actuators. As illustrated in FIG. 7, a set of perception sensors 30 can be arranged across a designated area 5, for the motion planning unit 106 to compute provisional commands based on signals from the perception sensors 30. This way, the CCU is configured to steer the automated vehicle in the designated area 5. Note, the perception sensors, the motion planning unit 106, and the validation unit 220, may be configured so that the CCU 2 can steer a plurality of automated vehicles in the designated area 5, as further discussed below.

Referring to FIGS. 1 and 2, a second aspect of the invention concerns a system for driving an automated vehicle 10, which may possible be an autonomous vehicle, as noted earlier. Main features of this vehicle have already been described, if only implicitly, in reference to the present methods. Thus, such features are only briefly described in the following. As explained earlier, the vehicle 10 comprises a DbW system 300 with electromechanical actuators. Use is further made of a motion planning unit 106 (e.g., forming part of a first processing system 100), and a validation unit 220 (e.g., forming part of a second processing system 200), where the units may be implemented at the vehicle 10 or a CCU 2. The validation unit 220 is configured to perform steps in accordance with the present methods, i.e., receive provisional commands and trigger an actuation sequence by generating effective commands based on the provisional commands received and timely sending the effective commands generated to the electromechanical actuators. Further details of the vehicle are described in Section 2.

In embodiments, the first processing system 100 is configured to form a main perception based on signals from each of the perception sensors of the set, estimate states of the vehicle based on feedback signals from the DbW system, and compute trajectories for the automated vehicle based on the perception formed and the estimated states. The second processing system 200 is configured to form an auxiliary perception based on signals from only a subset of the perception sensors, validate the computed trajectories based on the auxiliary perception formed, and cause to forward the validated trajectories to the DbW system.

In embodiments, the second processing system is further configured to: form said auxiliary perception as a global representation, which includes a world representation (i.e., a representation of the surroundings of the vehicle) and embeds a representation of the automated vehicle; validate, at each time point of a sequence of time points, the estimated states based on the auxiliary perception as formed at one or more previous one of the time points, whereby the computed trajectories are further validated based on the validated states, in operation; and update, at said each time point, both the world representation, thanks to said signals from the subset of sensors, and the representation of the automated vehicle, thanks to states of the vehicle as previously validated at one or more previous ones of the time points. This way, a self-consistent solution is achieved, timewise, in which the auxiliary perception is used to validate states as computed by the first processing system, whereas the validated states are subsequently used to update the vehicle representation in the auxiliary perception.

Preferably, the first processing system includes a main perception unit, a state estimation unit, and a motion planning unit. The main perception unit is connected to each of the sensors and is configured to form the main perception. The state estimation unit, to which the DbW system is connected, is configured to estimate the states of the vehicle. The motion planning unit is configured to compute said trajectories. The second processing system includes an auxiliary perception unit and a validation unit. The auxiliary perception unit is configured to form said auxiliary perception, while the validation unit is configured to validate the computed trajectories and cause to forward the validated trajectories to the DbW system. Such an architecture makes it possible to safely implement the self-consistent solution discussed above, inasmuch as each essential function is mapped to a respective unit, which unit can incidentally be mapped onto a respective processing means.

The practical implementation of the above functions may involve sets of processors, where each of the sets comprises one or more processors. Now, the main perception unit, the state estimation unit, the motion planning unit, the auxiliary perception unit, and the validation unit, can advantageously be mapped onto respective ones of the sets of processors. Even, the first processing system and the second processing system are preferably implemented as distinct computers, whether at the vehicle or the CCU. The exact mapping, however, may depend on the security levels offered by the (sets of) processors or computers. In variants, a single computer may be used, provided that its sets of processors are sufficiently safe. An example of suitable functional safety standard is defined by the ISO26262 standard for the development of electrical and electronic systems in road vehicles.

In preferred embodiments, the validation unit is configured to validate the computed trajectories by verifying that such trajectories are collision-free, based on said world representation, under the condition that the estimated states are validated. That is, the validation of the vehicle states acts as a software interrupt, whereby the trajectories can be recurrently and continually verified, until (i.e., unless) the vehicle states happen to be invalidated by the second processing system.

In embodiments, the auxiliary perception unit is configured to run an occupancy grid map generator and a vehicle pose checker. The occupancy grid map generator is designed to generate occupancy grids for successive ones of the time points based on signals obtained from said subset of perception sensors. Such occupancy grids are preferably updated at a frequency that is between 6 Hz and 18 Hz, e.g., at a frequency that is equal, or approximately equal, to 10 Hz. The occupancy grids capture the global representation. The vehicle pose checker is designed to validate the estimated states of the vehicle by comparing a first pose of the vehicle corresponding to the estimated states with a second pose of the vehicle as captured in said occupancy grids by the representation of the automated vehicle. Occupancy grids efficiently capture the world representation, especially when generated as 2D grids, as in preferred embodiments), which makes it possible to easily check for potential collisions. In addition, the embedded representation of the vehicle and the above update mechanism allow the vehicle states to be simply validated based on previously validated states.

Preferably, the vehicle pose checker is designed to validate the estimated states of the vehicle by comparing first speeds of the vehicle as captured by the estimated states with second speeds of the vehicle as captured in said occupancy grids by at least two successive representations of the automated vehicle at two or more successive ones of the time points. I.e., speeds can be taken into account, too, beyond the sole vehicle poses, to verify the vehicle states more exhaustively. Other quantities may similarly be considered, such as accelerations and angular speeds.

In preferred embodiments, the occupancy grid map generator is designed to update, at said each time point, a current grid of the occupancy grids based on the first pose as validated by the vehicle pose checker at one or more previous ones of the time points, preferably at one or more immediately preceding ones of the time points, so as to update the representation of the automated vehicle in the current grid. I.e., occupancy grids provide an efficient way to self-consistently updates the vehicle representation in the auxiliary perception. In addition, occupancy grids make it easy to verify that trajectories are collision-free, while the verification of the states can again function as a software interrupt. I.e., in preferred embodiments, the validation unit is configured to validate the computed trajectories by verifying that such trajectories are collision-free according to said occupancy grids, provided that the poses, and optionally speeds, of the vehicle, are validated by the vehicle pose checker.

In embodiments, the set of perception sensors include one or more lidars and one or more cameras, while said subset of perception sensors include the one or more lidars but does not include any of the one or more cameras. I.e., the sensor signals considered in each pipeline are obtained from heterogeneous types of sensors.

For example, use can be made of a plurality of lidars. In that case, the occupancy grid map generator may be designed to obtain each occupancy grid of said occupancy grids by independently obtaining concurrent occupancy grids based on signals obtained from distinct ones of the lidars and then merging the concurrent occupancy grids obtained into said each occupancy grid. This improves the signal-to-noise ratios of the grids obtained from the various lidars. Note, the occupancy grid map generator may advantageously be configured to obtain the concurrent occupancy grids in polar coordinates and then merge the concurrent occupancy grids obtained into a single occupancy grid, which is defined in cartesian coordinates. Polar coordinates lend themselves well to lidar detections, while the merged grid is better defined in cartesian coordinates as cartesian coordinates are eventually easier to work with, especially when dealing with maps and GPS signals.

Preferably, each occupancy grid comprises cells that can have different cell states, the latter including an occupied state and a free state, and optionally an unknow state. In that case, the occupancy grid map generator can be further designed to update cell states of cells of the occupancy grids based on time-redundant information obtained for the cells, whereby a change to any cell state is taken into account by the occupancy grid map generator only if information characterizing this change is observed twice in a row for two successive ones of said time points. Using time-redundant information mitigates the risk of accidental state changes and results in more consistent (also more accurate) grids.

As said, the cell states may further include an unknown state, in addition to said occupied state and said free state. Unknown cell states typically correspond to occluded regions of the surroundings of the vehicle, which the sensors cannot see or otherwise detect. In that regard, the occupancy grid map generator may advantageously be designed to implement a reset mechanism, for security reasons. This mechanism resets the state of any cell, for which no information can be obtained for a given time period or a given number of successive grids, to the unknown state. The validation heuristics may be adapted, based on this additional state, which eventually allows the validation unit to make better-informed decisions.

In preferred embodiments, the second processing system further comprises a misalignment detection unit, which is operatively connected to each of the one or more lidars to detect a potential misalignment thereof and cause each of the first processing system and the second processing system to discard signals obtained from any lidar for which a misalignment is detected. Moreover, the second processing system may further be configured to implement a lidar diagnosis unit, the latter designed to detect sensory errors of any of the one or more lidars. The misalignment detection unit and the lidar diagnosis unit contribute to reinforcing the level of security of the lidars. In turn, the validation unit can be more easily certified, such that the first processing system (in particular the motion planning unit) just need to be quality managed.

As illustrated in FIG. 8, the system 1 may comprise a CCU 2, which is distinct from the vehicle 10. The unit 2 includes the motion planning unit 106 and the validation unit 220. The unit 2 otherwise communicates with a set of perception sensors 30 arranged across a designated area 5, see FIG. 7. This way, the motion planning unit 106 can compute provisional commands based on signals received from the perception sensors 30. This unit 2 is further in data communication with the vehicle 10, such that the validation unit can timely send effective commands to the electromechanical actuators of the DbW system 300, whereby the CCU is configured to steer the automated vehicle in the designated area 5, in operation.

The system 1 may actually include a plurality of automated vehicles such as described earlier, as assumed in FIG. 8. The various components (i.e., the set of perception sensors, the motion planning unit 106, and the validation unit 220) of the system may cooperate so as to allow the CCU to steer a plurality of automated vehicles in the designated area 5, whether concomitantly or one after the other.

As further illustrated in FIG. 7, the perception sensors may be movable sensors, i.e., sensors that can be relocated across the designated area 5. In that case, the CCU 2 may instruct to move one or more of the sensors across the designated area 5 for the sensors to subsequently sense a local portion of the designated area and generate corresponding detection signals, as illustrated in FIG. 7.

A final aspect of the invention concerns a computer program product for driving an automated vehicle, where the computer program product comprises a computer readable storage medium having program instructions embodied therewith. The program instructions are executable by processing means of a validation unit 220 (whether implemented in a CCU or in an autonomous vehicle) to cause the latter to perform steps in accordance with the present methods. Additional details are provided in Section 3.

The above embodiments have been succinctly described in reference to the accompanying drawings and may accommodate a number of variants. Several combinations of the above features may be contemplated. Examples are given in the next section.

2. Specific Embodiments—Technical Implementation Details

2.1 Preferred System Architecture (FIGS. 1 and 2A)

FIG. 2A illustrates a preferred system architecture, which involves a first processing system 100 and a second processing system 100, a DbW system 300, as well as two sets of sensors, corresponding to lidars 21, 22 and cameras 23, 24, see FIG. 1. Additional types of sensors may possibly be involved, e.g., radars 25, 26, as well as a GPS, sonars (i.e., ultrasound sensors), and inertial measurement units (not shown in FIG. 1), if necessary. In preferred embodiments, the set of perception sensors at least include lidars 21, 22 and cameras 23, 24. The two sets of sensors connect to the first processing system 100, while only the lidars 21, 22 connect to the second processing system 200. The two processing systems are implemented as distinct computers. Their main functions are implemented at distinct CPUs.

The first processing system 100 is configured to run a main perception unit 102, a state estimation unit 104, and a motion planner unit 106. As explained in detail in Section 1, these units 102-106 are used to form a main perception based on signals obtained from each of the perception sensors 21-24, estimate states of the vehicle 10 based on feedback signals from the DbW system 300, and compute trajectories for the automated vehicle 10 based on the perception formed and the estimated states.

The second processing system 200 is configured to run an auxiliary perception unit 210, which includes a vehicle (ego) pose checker 212 and a grid map generator 214, and a validation unit 220. As explained in Section 1, the auxiliary perception unit 210 is configured to form an auxiliary perception based on signals from the second subset of perception sensors (i.e., the lidars 21, 22 in the example of FIG. 2), while the validation unit 220 is used to validate the computed trajectories using the auxiliary perception formed, in operation.

In detail, the occupancy grid map generator 214 is designed to generate occupancy grids for successive time points based on signals obtained from the lidars 21, 22. The occupancy grids capture a global representation, which includes a world representation (i.e., the surroundings of the ego vehicle 10) and embeds a representation 10*r* of the vehicle 10. The vehicle pose checker 212 is designed to validate the estimated states of the vehicle 10 by comparing the pose of the vehicle that corresponds to the estimated states with the pose as captured in the occupancy grids by the embedded representation of the automated vehicle. The occupancy grid map generator 214 updates each current occupancy grid, at each time point, based on the last pose validated by the vehicle pose checker 212.

The validation unit 220 is further connected to an emergency stop unit 230, which implements safety interlocks. When implemented at a CCU, the unit 220 may initiate an emergency stop by sending an emergency stop command. In particular, the CCU may cause the vehicle to perform an emergency stop if any of the checks fails. In addition, the vehicle may have minimal processing capability, if only to be able to implement an emergency stop procedure. Such a procedure may for instance be triggered, should the communication with the CCU be lost or an emergency button be pressed by a user in the vehicle. In both cases, the vehicle may switch to a driving based on the curvature profile of the last valid trajectory, e.g., by switching to a distance-based matching instead of a time-based matching. When a failure is detected, the safety interlocks switch the system to a safe mode, in which the vehicle reverts to a conservative regime to mitigate the risk of accident.

The second processing system 200 further includes lidar diagnosis units 202, which are connected to respective lidars 21, 22. The diagnosis units 202 are connected to a lidar misalignment detection unit 216, which forms part of the auxiliary perception unit 210. The validations proceed as long as the misalignment detection unit 216 permits and as long as no collision is detected, provided the vehicle states are duly verified.

2.2 Preferred Flows 2.2.1 High-Level Steps (FIG. 3)

At step S10, the validation unit receives a new trajectory (i.e., new series of provisional commands) from the motion planning unit 106 and stores S20 it in a buffer memory. Next, the validation unit verifies S30 whether the latest trajectory is consistent with the previous trajectories and may additionally verify the vehicle states and check potential collisions, as explained in Section 2.2.3 below. If the latest trajectory happens to be invalidated by the validation unit (S40: No), the validation unit triggers an auxiliary procedure S50. Else (S40: Yes), the validation unit deletes S60 the previous series of provisional commands and proceeds to generate S70 effective commands, prior to sending S80 the effective commands generated to electromechanical actuators of the DbW system. Eventually, the actuators execute S90 the effective commands sent to actuate the vehicle. If it appears impossible to suitably generate effective commands, the validation unit reverts to a safe mode and trigger the auxiliary procedure S50, as further discussed below.

Note, each block of steps S10-S30 and S70-S90 is iteratively performed, as suggested by the loops in FIG. 5, although outcomes of the first block impact the second block. The reader should keep in mind that the flows shown in FIGS. 3 and 4 are purposely simplified.

In particular, step S70 can be started as soon as the latest trajectory is validated (S40: Yes) without waiting for completion of step S60, notwithstanding the apparent step order in FIG. 3.

2.2.2 Generation of Effective Commands (FIG. 4)

FIG. 4 shows details of the generation S70 of effective commands. The steps are performed S71 for each actuator, typically in parallel, and not one after the other, as FIG. 4 may suggest. At each time instant, the validation unit computes S72 the effective time point of an actuator and checks S73 whether a provisional command is available, which matches this effective time point, subject to some tolerance. If a matching command is available (S73: Yes), the validation unit selects S74 this provisional command as the effective command to be sent to this actuator. Note, the expiration time of this provisional commands should normally be posterior to the effective time point and thus be compatible, as the expiration date expires later than the planned execution time of the command.

Else (S73: No), the validation unit checks S75 whether provisional commands are available, which have compatible expiration times. If so (S75: Yes), the validation unit selects S76 a subset of provisional commands, the planned execution times of which are the closest to the effective time point of the actuator, and which have compatible expiration times. Next, the validation unit determines S77 effective command, e.g., by extrapolation or interpolation, as explained in Section 1. Eventually, the validation unit returns S78 an effective command. The same process is performed in respect of each actuator (in parallel) and repeats at each time instant $t_i$, see FIGS. 5 and 6, i.e., at each algorithmic cycle. If no suitable provisional commands can be found for interpolation or extrapolation purposes, the validation unit reverts to a safe mode, see step S50 in FIG. 3.

Moreover, as noted in the previous section, the vehicle may itself trigger an emergency procedure (e.g., emergency stop), if necessary (not shown in FIG. 4).

2.2.3 Heterogeneous Redundancy Checks

Besides the consistency checks, the validation unit may perform various verifications. As explained in Section 1, the first processing system 100 forms a main perception (and then repeatedly updates it) based on signals from all perception sensors (i.e., lidars and cameras in FIG. 2). Vehicle states are concurrently estimated. The vehicle states and the main perception are used by the motion planner to compute provisional trajectories.

The second processing system 200 performs two main operations, which aim at forming and updating the auxiliary perception, and validating the initial trajectories based on auxiliary perception formed. This process is intertwined: The provisional trajectories are validated based on the auxiliary perception formed but the auxiliary perception is updated based on vehicle states as validated during a previous cycle. Such a scheme requires a proper initialization. A simple initialization scheme is to supress validation of the trajectory during the very first few cycles, such that the auxiliary perception will be initialized based on vehicle states as initially computed by the first processing system.

Once a normal regime is achieved, i.e., after a few cycles, the vehicle states are verified based on the vehicle pose (and optionally the speed) as captured in the auxiliary perception; the validation unit then verifies that the trajectories as computed by the first processing system are collision-free, using the auxiliary perception. The vehicle pose is subsequently updated and embedded in the auxiliary perception (i.e., involving a 2D grid for each time point), using the last validated vehicle state. The world representation can then be updated based on lidar signals. To that aim, concurrent grids are obtained from respective lidars and then merged into a single grid. Changes to the grid cells are validated using time-redundant information and the cells are reset to an unknown state after some cycles, should no information be available anymore. Next, the validation unit generates effective commands, as explained above, and such commands are eventually forwarded to the DbW system, with a view to implementing the corresponding commands and accordingly actuating the vehicle.

In preferred embodiments, the grid map generator 214 (FIG. 2) calculates a global occupancy grid map for each of the time points corresponding to a given trajectory, as forwarded by the first processing system. The grid map generator 214 provides a local slice based on the current vehicle position obtained from the ego check to the validation unit 220, for validation purposes. The global grid map is determined in two steps: First, a radial grid map is created separately for each lidar. After that, the radial grid maps of all lidars are merged into a global cartesian grid map. Each cell can have one of three states: known free, known occupied, and unknown (e.g., due to occlusion).

The vehicle pose checker 212 allows redundancy checks. I.e., the vehicle pose checker 212 receives and buffers the state estimates from the state estimation unit 104. As soon as a new grid map is received from the grid map generator 214, the corresponding state as determined by a corresponding time point (timestamp) is fetched from a memory buffer and the vehicle pose is checked against the grid map. The check includes verifying the speed and direction of motion by comparing the pose information of a few consecutive poses against the speed signals of the vehicle 10 and its orientation. If the check is successful, the state is sent to the validation unit 220, for validation purposes. Alternatively, the validation unit 220 may assumes this check to be successful, by default, such that validations would proceed until the vehicle pose checker 212 informs that the states are no longer validated.

Furthermore, each validated state is sent to the grid map generator 214, which adjusts the local slice of the global grid map based on the validated vehicle position. The validation unit 220 checks the trajectory calculated in the motion planner to ensure it is safe, i.e., free of collisions. This is done based on the verified pose, the speed of the car, the occupancy grid map, the verified object list, the map of the surroundings, and the calculated trajectory.

As noted in the previous section, any failure in the verifications performed at step S30 would switch the system to a safe mode and, e.g., trigger an emergency stop. In particular, the unit 220 further initiates an emergency stop if any emergency button is pressed or if any component sends an emergency stop drive command. Furthermore, the validation unit ensures proper time synchronization across all connected units as well as a proper communication between all of such units based on timeout signals.

2.2.4 Movable Sensors (FIGS. 7 and 8)

The CCU 2 may be used to remotely control one or more vehicles 10 equipped with a DbW system. To that aim, use can be made of movable perception sensors 30, see FIG. 7. The CCU 2 may for instance instruct one or more of the movable sensors 30 to move across a designated area 5 for the movable sensors to sense at least a part of the designated area and generate corresponding detection signals. A configuration of the designated area is then updated based on the generated detection signals. This configuration may for instance include a list of objects and respective (e.g., 2D) positions in the designated area, where the objects include the one or more vehicles and other objects, such as the one or more movable sensors and obstacles. In turn, the updated configuration makes it possible to plan one or more vehicle trajectories from one or more current positions to one or more destination positions in the designated area. The one or more vehicle trajectories are then transmitted to respective ones of the automated vehicles 10 for them to automatically drive to the one or more destination positions. This way, vehicles can be automatically relocated in the designated area 5. Movable sensors reduce the number of required sensors and allows the sensor positions to be finely tuned in accordance with the logistic problem to be solved.

The movable sensors are preferably robots designed as ground vehicles, as assumed in FIG. 7. The robots 30 may be instructed to drive along respective paths to sense the designated area (or a part thereof) and generate corresponding detection signals. Note, such paths can be determined by the CCU according to a logistics goal, which is preferably devised based on last known positions of the automated vehicles, prior to being transmitted to the robots. The robots can be dimensioned so as to be able to drive between under the vehicles 10*a* parked in the parking lots 5. Moreover, the sensor robots can be dimensioned to be able to pass under the vehicle frames. E.g., a maximal lateral dimension of each robot 30 is between 200 mm and 500 mm, while a vertical dimension of each robot is between 60 and 150 mm.

In embodiments, each robot has a chassis supporting one or more batteries, four electrical motors powered by the one or more batteries, four omnidirectional wheels coupled to respective ones of the electrical motors, a Lidar sensor mounted on top of the chassis, a camera, and a GPS antenna. In addition, the chassis supports processing means, which include a main processing unit, a Lidar processing unit connected to the lidar sensor, and a GPS processing unit connected to the GPS antenna. Moreover, the chassis supports a radio receiver with an antenna for wireless data communication with the CCU 2, through radio transmission means 3, where the radio receiver is connected to the main processing unit.

In detail, the computer architecture of each sensor robot 30 may include processing means, memory, and one or more memory controllers. A system bus coordinates data flows throughout the robot components, i.e., the four electrical motors (via a dedicated control unit), the Lidar sensor (via a respective processing unit), the GPS antenna (via a GPS processing unit), and the antenna (via a radio transceiver). In addition, the computerized unit of each robot may include storage means, storing methods in the form of software, meant to be loaded in the memory and executed by the main processing unit of each robot. In this example, each robot 30 is equipped with a Lidar sensor and a camera, something that allows heterogeneous redundancy checks, as explained earlier. More generally, each robot may include a set of heterogenous sensors.

Similarly, each vehicle includes a radio receiver, which wirelessly receives data from the CCU 2. Such data are transmitted through a transmission antenna 3 and received by a reception antenna mounted in the vehicle, whereby the vehicle can be operated in an automated manner, based on signals received from the CCU 2. Thus, the CCU 2 may orchestrate movements of the robots 30 and vehicles 10 in essentially the same way.

3. Technical Implementation Details

Computerized devices can be suitably designed for implementing embodiments of the present invention as described herein. In that respect, it can be appreciated that the methods described herein are at least partly non-interactive, i.e., automated. Automated parts of such methods can be implemented in software, hardware, or a combination thereof. In exemplary embodiments, automated parts of the methods described herein are implemented in software, as a service or an executable program (e.g., an application), the latter executed by suitable digital processing devices.

In the present context, each unit is preferably mapped onto a respective processor (or a set of processor cores) and each processing system 100, 200 is preferably implemented as a respective computer.

A suitable computer will typically include at least one processor and a memory (possibly including several memory units) coupled to one or memory controllers. Each processor is a hardware device for executing software, as e.g., loaded in a main memory of the device. The processor, which may in fact comprise one or more processing units (e.g., processor cores), can be any custom made or commercially available processor, likely subject to some certification.

The memory typically includes a combination of volatile memory elements (e.g., random access memory) and non-volatile memory elements, e.g., a solid-state device. The software in memory may include one or more separate programs, each of which comprises an ordered listing of executable instructions for implementing logical functions. The software in the memory captures methods described herein in accordance with exemplary embodiments, as well as a suitable operating system (OS). The OS essentially controls the execution of other computer (application) programs and provides scheduling, input-output control, file and data management, memory management, and communication control and related services. It may further control the distribution of tasks to be performed by the processors.

The methods described herein shall typically be in the form of executable program, script, or, more generally, any form of executable instructions.

In exemplary embodiments, each computer further includes a network interface or a transceiver for coupling to a network (not shown). In addition, each computer will typically include one or more input and/or output devices (or peripherals) that are communicatively coupled via a local input/output controller. A system bus interfaces all components. Further, the local interface may include address, control, and/or data connections to enable appropriate communications among the aforementioned components. The I/O controller may have additional elements, which are omitted for simplicity, such as controllers, buffers (caches), drivers, repeaters, and receivers, to allow data communication.

When a computer is in operation, one or more processing units executes software stored within the memory of the computer, to communicate data to and from the memory and/or the storage unit (e.g., a hard drive and/or a solid-state memory), and to generally control operations pursuant to software instruction. The methods described herein and the OS, in whole or in part are read by the processing elements, typically buffered therein, and then executed. When the methods described herein are implemented in software, the methods can be stored on any computer readable medium for use by or in connection with any computer related system or method.

Computer readable program instructions described herein can be downloaded to processing elements from a computer readable storage medium, via a network, for example, the Internet and/or a wireless network. A network adapter card or network interface may receive computer readable program instructions from the network and forwards such instructions for storage in a computer readable storage medium interfaced with the processing means. All computers and processors involved are synchronized, thanks to timeout messages.

Aspects of the present invention are described herein notably with reference to a flowchart and a block diagram. It will be understood that each block, or combinations of blocks, of the flowchart and the block diagram can be implemented by computer readable program instructions.

These computer readable program instructions may be provided to one or more processing elements as described above, to produce a machine, such that the instructions, which execute via the one or more processing elements create means for implementing the functions or acts specified in the block or blocks of the flowchart and the block diagram. These computer readable program instructions may also be stored in a computer readable storage medium.

The flowchart and the block diagram in the accompanying drawings illustrate the architecture, functionality, and operation of possible implementations of the computerized devices, methods of operating it, and computer program products according to various embodiments of the present invention. Note that each computer-implemented block in the flowchart or the block diagram may represent a module, or a portion of instructions, which comprises executable instructions for implementing the functions or acts specified therein. In variants, the functions or acts mentioned in the blocks may occur out of the order specified in the figures. For example, two blocks shown in succession may actually be executed in parallel, concurrently, or still in a reverse order, depending on the functions involved and the algorithm optimization retained. It is also reminded that each block and combinations thereof can be adequately distributed among special purpose hardware components.

While the present invention has been described with reference to a limited number of embodiments, variants, and the accompanying drawings, it will be understood by those skilled in the art that various changes may be made, and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention is not limited to the particular embodiments disclosed, but that the present invention will include all embodiments falling within the scope of the appended claims. In addition, many other variants than explicitly touched above can be contemplated. For example, further initialization or emergency procedures may be involved, which are not described in this document.

The invention claimed is:

1. A method of driving an automated vehicle comprising a drive-by-wire (DbW) system with electromechanical actuators, wherein the method comprises, at a validation unit:

receiving, from a motion planning unit, provisional commands containing provisional instructions with respective execution times, the provisional commands designed to be executed by respective ones of the electromechanical actuators to cause the vehicle to follow a drivable trajectory, wherein the validation unit operates as an entity distinct from the motion planning unit and the DbW system; and triggering an actuation sequence by generating effective commands based on the provisional commands received and timely sending the effective commands generated to the electromechanical actuators, whereby an effective command containing an effective instruction is repeatedly generated for and sent to each actuator of said electromechanical actuators, wherein each effective command of at least some of the effective commands sent to said each actuator is generated by:

selecting, among the provisional commands received in respect of said each actuator, two or more provisional commands in accordance with an effective time point, the latter corresponding to a current time point corrected to compensate for a respective actuator delay of said each actuator, and determining the effective instruction of said each effective command based on provisional instructions of the two or more provisional commands selected and their respective execution times.

2. The method according to claim 1, wherein the provisional commands received further include respective expiration times, and the two or more provisional commands are selected so that their respective expiration times are not anterior to said effective time point.

3. The method according to claim 2, wherein the method further comprises generating an emergency command for each of the electromechanical actuators if the expiration times of the provisional commands available for selection are incompatible with the effective time point corresponding to any of the actuators.

4. The method according to claim 2, wherein series of provisional commands are repeatedly received at the validation unit from the motion planning unit, and the method further comprises, at the validation unit, verifying that the provisional commands of a series received last are consistent with provisional commands of a series previously received.

5. The method according to claim 4, wherein the provisional commands received are stored in a buffer memory of the validation unit, the two or more provisional commands are selected from provisional commands as stored in the buffer memory, and the method further comprises, at the validation unit, deleting, from the buffer memory, provisional commands of the series previously received only if and once the provisional commands of the series received last have been verified to be consistent with the provisional commands of the series previously received.

6. The method according to claim 4, wherein each of the series of provisional commands determines a drivable trajectory whose time horizon is between 2 and 18 seconds, and, in each of the series, the execution times of successive provisional commands for each of the electromechanical actuators are spaced 60 to 190 ms apart, on average.

7. The method according to claim 1, wherein said two or more provisional commands are selected for said each actuator so that their respective execution times are the closest to said effective time point.

8. The method according to claim 7, wherein said two or more provisional commands are selected for said each actuator so that at least one of their respective execution times is anterior to said effective time point and at least another one of their respective execution times is posterior to said effective time point, and said effective instruction is determined by interpolating the provisional instructions of the two or more provisional commands selected, based on their respective execution times and said effective time point.

9. The method according to claim 8, wherein exactly two of the provisional commands are selected and said effective instruction is determined thanks to a first-order interpolation.

10. The method according to claim 1, wherein the motion planning unit is implemented by a first processing system, the validation unit is implemented by a second processing system, each of the first processing system and the second processing system is distinct from the DbW system, and the method further comprises repeatedly coordinating independent clocks of the first processing system, the second processing system, and the DbW system, to ensure synchronization across the first processing system, the second processing system, and the DbW system, based on local time messages repeatedly sent from the second processing system to several recipients across the first processing system and the DbW system, for each of said recipients to accordingly adjust its internal clock.

11. The method according to claim 10, wherein the method further comprises, at the first processing system, forming a main perception based on signals from each perception sensor of a set of perception sensors and estimating states of the vehicle based on feedback signals from the DbW system, prior to computing said provisional commands through the motion planning unit based on the perception formed and the estimated states, and, at the second processing system, forming an auxiliary perception based on signals from only a subset of the perception sensors, and validating the provisional commands received based on the auxiliary perception formed.

12. The method according to claim 11, wherein said auxiliary perception is formed as a global representation, which includes a world representation embedding a representation of the automated vehicle, and the method further comprises, at the second processing system, validating the estimated states based on the auxiliary perception formed, whereby the provisional commands are validated based on the validated states, and updating both the world representation, thanks to said signals from the subset of sensors, and the representation of the automated vehicle, thanks to one or more previously validated states of the vehicle.

13. The method according to claim 1, wherein the motion planning unit and the validation unit form part of a central control unit, which is distinct from the vehicle, and the central control unit is in data communication with the vehicle, for the validation unit to timely send the effective commands generated to the electromechanical actuators, and with a set of perception sensors arranged across a designated area, for the motion planning unit to compute said provisional commands based on signals from the perception sensors, whereby the central control unit is configured to steer the automated vehicle in the designated area.

14. The method according to claim 13, wherein the set of perception sensors, the motion planning unit, and the validation unit, are configured so that the central control unit is adapted to steer a plurality of automated vehicles in the designated area.

15. A system for driving an automated vehicle, the system comprising:

an automated vehicle having a drive-by-wire (DbW) system with electromechanical actuators;

a motion planning unit; and a validation unit configured to operate as an entity distinct from the motion planning unit and the DbW system, the validation unit configured to:

receive, from the motion planning unit, provisional commands containing provisional instructions with respective execution times, the provisional commands designed to be executed by respective ones of the electromechanical actuators to cause the vehicle to follow a drivable trajectory; and trigger an actuation sequence by generating effective commands based on the provisional commands received and timely sending the effective commands generated to the electromechanical actuators, wherein, in operation, an effective command containing an effective instruction is repeatedly generated for and sent to each actuator of said electromechanical actuators, and each effective command of at least some of the effective commands sent to said each actuator is generated by:

selecting, among the provisional commands received in respect of said each actuator, two or more provisional commands in accordance with an effective time point, the latter corresponding to a current time point corrected to compensate for a respective actuator delay of said each actuator, and determining the effective instruction of said each effective command based on provisional instructions of the two or more provisional commands selected and their respective execution times.

16. The system according to claim 15, wherein the system comprises a central control unit, which is distinct from the vehicle and includes the motion planning unit and the validation unit, and the central control unit is in data communication with the vehicle, for the validation unit to timely send the effective commands generated to the electromechanical actuators, and with a set of perception sensors arranged across a designated area, for the motion planning unit to compute said provisional commands based on signals from the perception sensors, whereby the central control unit is configured to steer the automated vehicle in the designated area, in operation.

17. The system according to claim 16, wherein the system includes a plurality of automated vehicles, each according to said automated vehicle, and the set of perception sensors, the motion planning unit, and the validation unit, are configured so that the central control unit is adapted to steer said plurality of automated vehicles in the designated area.

18. The system according to claim 16, wherein the perception sensors are movable sensors, which can be relocated across the designated area, and the central control unit is further configured to instruct to move one or more of the movable sensors across the designated area for the movable sensors to be able to sense at least a part of the designated area and generate corresponding detection signals.

19. A computer program product for driving an automated vehicle comprising a drive-by-wire (DbW) system with electromechanical actuators, the computer program product comprising a non-transitory computer readable storage medium having program instructions embodied therewith, the program instructions executable by processing means of a validation unit to cause the latter to:

receive, from a motion planning unit, provisional commands containing provisional instructions with respective execution times, the provisional commands designed to be executed by respective ones of the electromechanical actuators to cause the vehicle to follow a drivable trajectory, wherein the validation unit operates as an entity distinct from the motion planning unit and the DbW system; and trigger an actuation sequence by generating effective commands based on the provisional commands received and timely sending the effective commands generated to the electromechanical actuators, wherein, in operation, an effective command containing an effective instruction is repeatedly generated for and sent to each actuator of said electromechanical actuators, and each effective command of at least some of the effective commands sent to said each actuator is generated by:

selecting, among the provisional commands received in respect of said each actuator, two or more provisional commands in accordance with an effective time point, the latter corresponding to a current time point corrected to compensate for a respective actuator delay of said each actuator, and determining the effective instruction of said each effective command based on provisional instructions of the two or more provisional commands selected and their respective execution times.

* * * * *